US008960902B2

(12) United States Patent
Becken et al.

(10) Patent No.: US 8,960,902 B2
(45) Date of Patent: Feb. 24, 2015

(54) METHOD AND APPARATUS FOR PRODUCING A SPECTACLE LENS IN CONSIDERATION OF MONOCULAR AND BINOCULAR PROPERTIES

(75) Inventors: Wolfgang Becken, Munich (DE); Gregor Esser, Munich (DE); Helmut Altheimer, Baisweil-Lauchdorf (DE); Dietmar Uttenweiler, Icking (DE)

(73) Assignee: Rodenstock GmbH, Munich (DE)

( * ) Notice: Subject to any disclaimer, the term of this patent is extended or adjusted under 35 U.S.C. 154(b) by 332 days.

(21) Appl. No.: 12/810,802

(22) PCT Filed: Dec. 22, 2008

(86) PCT No.: PCT/EP2008/011023
§ 371 (c)(1),
(2), (4) Date: Sep. 22, 2010

(87) PCT Pub. No.: WO2009/083218
PCT Pub. Date: Jul. 9, 2009

(65) Prior Publication Data
US 2011/0051082 A1 Mar. 3, 2011

(30) Foreign Application Priority Data
Dec. 28, 2007 (DE) .......................... 10 2007 062 929

(51) Int. Cl.
*G02C 7/02* (2006.01)
*G02C 7/06* (2006.01)
(52) U.S. Cl.
CPC *G02C 7/02* (2013.01); *G02C 7/024* (2013.01); *G02C 7/028* (2013.01); *G02C 7/061* (2013.01)
USPC .................................................... 351/159.76
(58) Field of Classification Search
USPC ................... 351/159.73, 159.76, 177
See application file for complete search history.

(56) References Cited

U.S. PATENT DOCUMENTS

| 2003/0142266 A1 | 7/2003 | Haimerl et al. |
| 2007/0132945 A1* | 6/2007 | Haser et al. ................... 351/159 |
| 2007/0285620 A1* | 12/2007 | Clark ............................ 351/169 |

FOREIGN PATENT DOCUMENTS

| DE | 10 2005 057 553 A1 | 6/2007 |
| JP | 2003-518275 | 6/2003 |

(Continued)

OTHER PUBLICATIONS

Becken, Wolfgang, Anne Seidemann, Helmut Altheimer, Gregor Esser, and Dietmar Uttenweiler. "Spectacle Lenses in Sports: Optimization of the Imaging Properties Based on Physiological Aspects." Z. Med. Phys. 17 (2007): 56-66. Print.*
Becken, Wolfgang, et al. Uttenweiler. "Spectacle Lenses in Sports: Optimization of the Imaging Properties Based on Physiological Aspects." Z. Med. Phys. 17 (2007): 56-66. Print—translation thereof.*

(Continued)

*Primary Examiner* — Zachary Wilkes
(74) *Attorney, Agent, or Firm* — Schiff Hardin LLP

(57) ABSTRACT

A method and apparatus for producing a first spectacle lens of a pair of spectacle lenses to be used with a second spectacle lens for a specific situation of wear, in which optical parameters for the spectacle lens are calculated to minimize the value of a target function that corresponds to the pair of spectacle lenses. The target function is the sum of a first monocular function, with a weighting factor, that depends on the values of a first monocular optical property at a plurality of monocular evaluation points, a the binocular function, with a weighting factor, that depends on the values of a second monocular optical property at the plurality of pairs of binocular evaluation points, and a remainder term.

18 Claims, 4 Drawing Sheets

(56) References Cited

FOREIGN PATENT DOCUMENTS

| | | |
|---|---|---|
| JP | 2006-514336 | 4/2006 |
| WO | WO 01/46744 | 6/2001 |
| WO | WO-01/84213 A2 | 11/2001 |
| WO | WO 2004/086125 | 10/2004 |
| WO | WO-2004/086125 A1 | 10/2004 |
| WO | 2008/000397 A1 | 1/2008 |
| WO | WO-2008/089996 A1 | 7/2008 |

OTHER PUBLICATIONS

Becken et al., Z. Med. Phys., vol. 17, pp. 56-66 (2007).
Heinz Diepes, Refraktionsbestimmung, vol. 3, pp. 74-75 (2004).
Howard et al., "Binocular Vision and Stereopsis", Oxford University Press, pp. 38-39, 560 (1995).
Japanese Office Action dated Apr. 2, 2013 with English translation.

* cited by examiner

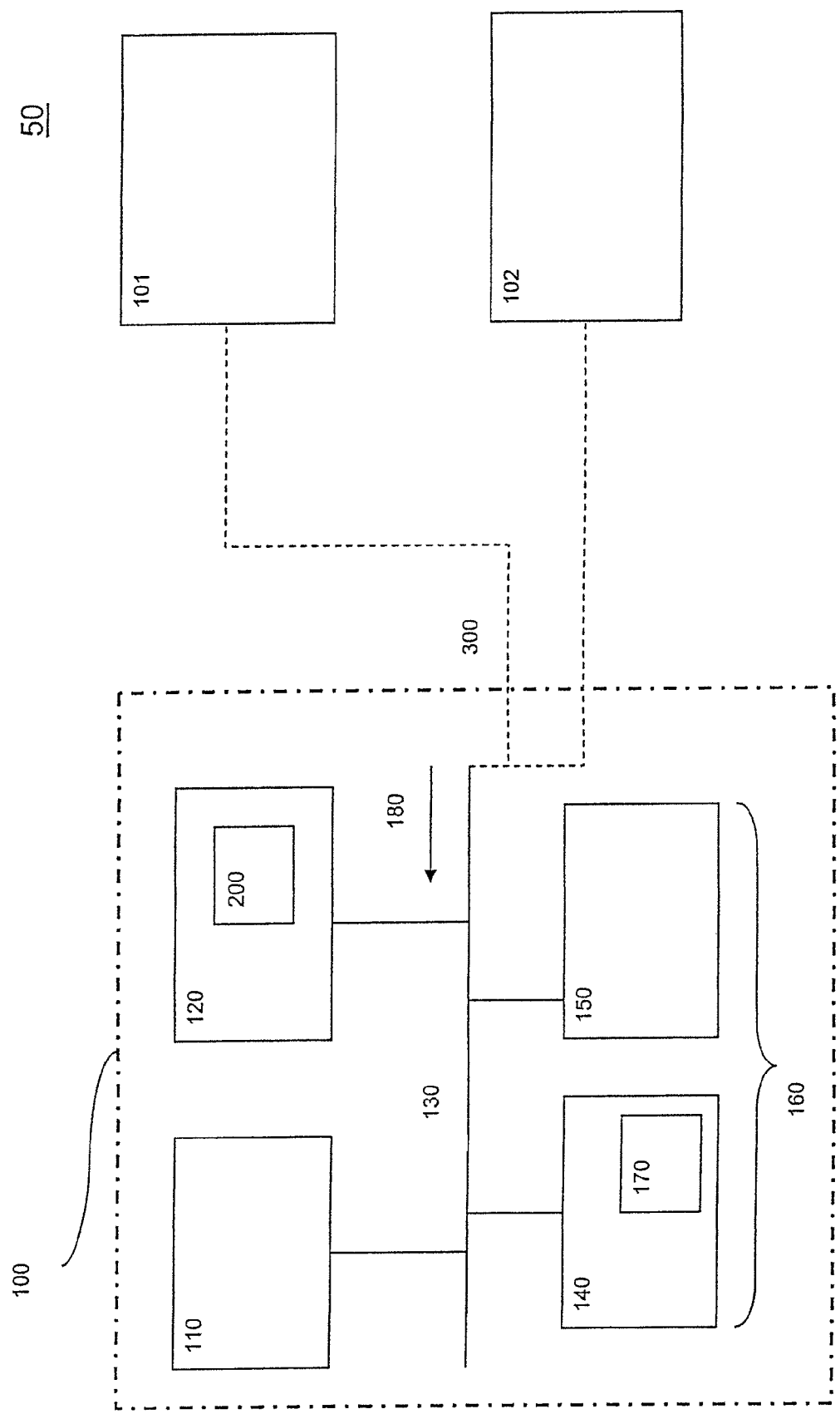

METHOD AND APPARATUS FOR PRODUCING A SPECTACLE LENS IN CONSIDERATION OF MONOCULAR AND BINOCULAR PROPERTIES

The embodiments disclosed herein relate to a method for the optimization and production of spectacle lenses for spectacle lens pairs with an improved binocular tolerability for a spectacle wearer. Moreover, the disclosure relates to a computer program product, a storage medium, and an apparatus for the production of at least one spectacle lens.

BACKGROUND

For the production or optimization of spectacle lenses, in particular of individual spectacle lenses, each spectacle lens is manufactured such that the best possible correction of a refractive error of the respective eye of the spectacle wearer is obtained for each desired direction of sight or each desired object point. However, a full correction for all directions of sight at the same time is normally not possible. Therefore, the spectacle lenses are manufactured such that they achieve a good correction of visual defects of the eye and only small aberrations especially in central visual regions, while larger aberrations are permitted in peripheral regions. These aberrations depend on the type and scope of the necessary corrections as well as on the position of the spectacle lens, i.e. the respective visual point. When looking through the spectacles, the eye pair continuously performs eye movements, whereby the visual points change within the spectacle lens. Eye movements always result in changes of the imaging properties, in particular of the aberrations for each spectacle lens of spectacles, which might lead to a worse perceived quality of vision and possibly to intolerance of spectacles. In the case of a predetermined position of wear of the spectacles for a spectacle wearer, i.e. a predetermined position of the spectacle lenses in front of the eyes of the spectacle wearer, and a predetermined object distance, a corresponding pair of visual points through the left and/or the right spectacle lens occurs for many object points, which generally are not arranged symmetrically and during eye movements mostly change differently in the individual spectacle lenses depending on the object position. This also leads to different changes of the aberrations of the right and left eyes, which in turn has a negative effect on the visual impression and possibly even on the tolerability of spectacles. In particular in the case of spectacle lenses with a different prescription for the left and right eyes, the different change of aberrations of the left and right eyes during eye movements, but also a constant difference of the optical properties during straight or side vision, often leads to a bad binocular visual impression.

SUMMARY

Thus, it is an object of the preferred embodiments disclosed herein to improve the perceived optical quality and the tolerability of spectacles for a spectacle wearer, in particular with different prescriptions for the left and the right spectacle lens.

This object is solved by a method for the production of at least one spectacle lens, a computer program product, a storage medium, and an apparatus for the production of a spectacle lens.

Thus, the preferred embodiments disclosed herein provides a computer-implemented method for the optimization and production of at least one first spectacle lens for a pair of spectacle lenses for use together with a second spectacle lens of the pair of spectacle lenses in spectacles for a specific situation of wear, comprising a binocular calculation or optimization step of at least one surface of the first spectacle lens such that a target function $$F = g^{(1)} F_{mono}^{(1)} + g^{bino} F_{bino} + \tilde{F}$$

is minimized, which is defined as the sum of at least one first monocular function $F_{mono}^{(1)}$ and one binocular function $F_{bino}$ with respective weighting factors $g^{(1)}$ and $g^{bino}$, respectively, wherein the first monocular function $F_{mono}^{(1)}$ depends on the values of at least one first monocular optical property $Mon^{(m1)}$ at a multitude of evaluation points $i_1$ of the first spectacle lens, and wherein the binocular function $F_{bino}$ for a multitude of pairs $(i_1^b, i_2^b)$ of respectively one binocular evaluation point $i_1^b$ of the first spectacle lens and a, in the specific situation of wear, corresponding binocular evaluation point $i_2^b$ of the second spectacle lens depends on the values of a second monocular optical property $Mon^{(b)}$ both at the binocular evaluation point $i_1^b$ of the first spectacle lens and at the binocular evaluation point $i_2^b$ of the second spectacle lens.

Depending on the desired application, the "first" spectacle lens constitutes a right spectacle lens and the "second" spectacle lens a left spectacle lens, or vice versa. With respect to the dependencies of the first monocular function and the binocular function on the first and second, respectively, monocular optical properties at the individual evaluation points, the target function can in particular be represented as $$F = g^{(1)} F_{mono}^{(1)}(Mon_1^{(m1)}(i_1)) + g^{bino} F_{bino}(Mon_1^{(b)}(i_1^b), Mon_2^{(b)}(i_2^b)) + \tilde{F},$$

wherein in the notation $Mon_1^{(m1)}$ for the first monocular optical property, the additional index "1" expresses that this property is to be analyzed for the first spectacle lens, i.e. at an evaluation point of the first spectacle lens. Preferably, as is e.g. the case above and will be shown in the following, this index might also be left out, especially if it becomes clear that the property has to be analyzed for an evaluation point of the first spectacle lens. In particular, the first monocular function does not depend on the second spectacle lens, which is why it is referred to as "monocular" function in this context. The binocular function, however, depends on value pairs of corresponding evaluation points of the first and the second spectacle lens, which is expressed by the term "binocular" function. Thus, via the binocular function, optical properties of both spectacle lenses are taken into account in the target function for optimization of the at least one spectacle lens, wherein the weighting functions are chosen such that the binocular function $F_{bino}$ contributes to the target function at least one evaluation point. Due to this contribution of the second spectacle lens, the at least one spectacle lens does not achieve the optimum refraction correction for the corresponding eye in the minimization of the target function.

However, it turns out that despite such a deterioration of the imaging quality of the respective spectacle lens, binocular vision and thus the tolerability and acceptance of the spectacle lens pair are considerably improved. In particular, it turns out that by means of the preferred embodiments, differences of optical properties of the two spectacle lenses in corresponding visual points as well as different changes of the optical properties, especially aberrations, of the two spectacle lenses during eye movements can be matched to each other to a greater or lesser extent depending on the choice of weighting function, whereby the binocular visual impression and thus the entire perceived quality of vision as well as the tolerability of spectacles, in particular in binocular terms, can be improved. In particular, it turns out that due to the consideration of monocular optimization targets via the at least one monocular function on the one hand and binocular balancing targets between the two spectacle lenses via the binocular function on the other hand, according to the preferred embodiments, the at least one first spectacle lens can be improved for use in the spectacles together with the second spectacle lens, even though it is accepted that at least one of the two spectacle lenses does not achieve its monocular optimum. The desired compromise between monocular and binocular needs can be controlled via the weighting function.

The situation of wear specifies a positioning of the spectacle lenses in front of the eyes of the spectacle wearer and an object distance model. Therewith, as the situation of wear, in particular data of wear with respect to a positioning of the spectacle lenses for a spectacle wearer and with respect to a visual task of the spectacle wearer are collected or provided. Such data of wear preferably comprise frame data, in particular with respect to a box dimension of the frame lenses or frame spectacle lens shapes and/or the bridge width and/or a face form angle and/or a pantoscopic angle etc. of the spectacles. In a preferred embodiment, the data of wear with respect to a visual task comprise a specification on mainly used viewing angle zones and/or mainly used object distances.

In any case, the specific situation of wear for a multitude of directions of sight of at least one eye of the spectacle wearer uniquely specifies the position of an associated object point such that the visual ray of the other eye when looking at the same object point (depending on the optical power of the associated spectacle lens) is uniquely specified as well. The two visual rays (for the left and right eyes) belonging to an object point are referred to as corresponding visual rays. Respective penetration points of the corresponding visual rays through the two spectacle lenses are referred to as corresponding visual points. Here, each visual point can represent an evaluation point for the spectacle lens on the front and/or the back surface of a spectacle lens. Due to the clear assignment of the visual rays and object points to the visual points through the spectacle lens, the respective evaluation point might also be represented by the corresponding visual ray or the direction of sight and/or the object point. In a preferred embodiment, the evaluation points of a spectacle lens are represented by two coordinates of a coordinate system specified with respect to the spectacle lens. To this end, preferably a Cartesian x-y-z coordinate system is specified, the origin of which e.g. being in the geometric center (the uncut or raw round first or the second spectacle lens) or in the lens center of the first or the second spectacle lens in particular on the front surface thereof, wherein the y axis extends in the vertical direction in the position of wear or situation of wear, and the z axis faces toward the eye. Thus, the evaluation points can in particular be represented by the x-y coordinates of the visual points.

Pairs of evaluation points of the left and the right spectacle lens, which represent corresponding visual points, are referred to as corresponding evaluation points. The corresponding evaluation points relate to a common object point viewed by both eyes at the same time, which is why the corresponding evaluation points depend on the specific situation of wear. Each evaluation point of a spectacle lens belonging to a pair of corresponding evaluation points contributes to binocular vision through the spectacles, which is why the evaluation points are referred to as "binocular evaluation points" here. Thus, binocular evaluation points $i_s^b$ of the first (s=1) or the second (s=2) spectacle lens are all those evaluation points $i_s$ of the respective lens for which a corresponding evaluation point of the other spectacle lens exists. The amount of all binocular evaluation points of each spectacle lens thus forms a binocularly calculatable region $GB_s$ of the respective spectacle lens.

All those evaluation points $i_s$ of a spectacle lens for which no corresponding evaluation point of the other spectacle lens exists in the specific situation of wear, in particular since the corresponding visual ray does not pass through the other spectacle lens but past it, are referred to as monocular evaluation point $i_s^m$ of the respective spectacle lens here. Accordingly, in particular each evaluation point $i_s$ of a spectacle lens either represents a binocular evaluation point $i_s^b$ or a monocular evaluation point $i_s^m$ of the spectacle lens.

Depending on the desired application or objective, the first or the second spectacle lens (or the spectacle lens pair to be optimized) can be arranged in a predetermined or predeterminable situation of wear in front of the eyes of an average or individually determined spectacle wearer.

An average situation of wear (as defined in DIN 58 208 part 2) can be characterized by:
- parameters of a standard eye, such as the so-called Gullstrand's schematic eye of a spectacle wearer (ocular center of rotation, entrance pupil, and/or principal plane, etc.);
- parameters of a standard position of wear or arrangement of the spectacle lens pair in front of the eyes of the spectacle wearer (face form angle, pantoscopic angle, corneal vertex distance, etc.); and/or
- parameters of a standard object model or standard object distance.

For example, the position of wear can be specified on the basis of a standardized position of wear. If the spectacle frame or the spectacles according to a standardized position of wear are used, the ocular center of rotation distance is approx. 27.4 mm or approx. 27.9 mm or approx. 28.5 mm or approx. 28.8 mm, the forward inclination, i.e. the pantoscopic angle, is approx. 8°, the face form angle is approx. 0°, the pupillary distance is approx. 63 mm, the corneal vertex distance is approx. 15 mm, the object distance in the distance reference point is approx. 0 D, and the object distance in the near reference point is approx. −2.5 D.

In particular, if the spectacle frame or the spectacles according to a standardized position of wear are used, the ocular center of rotation distance is approx. 26.5 mm, the forward inclination, i.e. the pantoscopic angle, is approx. 9°, the face form angle is approx. 5°, the pupillary distance is approx. 64 mm, and the corneal vertex distance is approx. 13 mm.

Alternatively, if the spectacle frame or the spectacles according to a standardized position of wear are used, the ocular center of rotation distance is approx. 28.5 mm, the forward inclination, i.e. the pantoscopic angle, is approx. 7°, the face form angle is approx. 0°, the pupillary distance is approx. 63 mm, and the corneal vertex distance is approx. 15 mm.

Alternatively, if the spectacle frame or the spectacles according to a standardized position of wear are used, the ocular center of rotation distance is approx. 25 mm, the forward inclination, i.e. the pantoscopic angle, is approx. 8°, the face form angle is approx. 5°, the pupillary distance is approx. 64 mm, and the corneal vertex distance is approx. 13 mm.

Alternatively, if the spectacle frame or the spectacles according to a standardized position of wear are used, the ocular center of rotation distance is approx. 27.5 mm, the forward inclination, i.e. the pantoscopic angle, is approx. 11°, the face form angle is approx. 0°, the pupillary distance is approx. 65 mm, and the corneal vertex distance is approx. 14 mm.

The following numerical parameters e.g. characterize an average situation of wear:
- corneal vertex distance (CVD)=15.00 mm;
- pantoscopic angle=8.0 degrees;
- face form angle=0.0 degrees;
- pupillary distance=63.0 mm;
- ocular center of rotation distance e=28.5 mm;
- object distance model: infinite object distance in the upper portion of the spectacle lens, which smoothly transitions to an object distance of 2.6 D with x=0 mm, y=−20 mm.

Alternatively, individual parameters of the eye or the eyes of a certain spectacle wearer (ocular center of rotation, entrance pupil, and/or principal plane, etc.), the individual position of wear or arrangement in front of the eyes of the spectacle wearer (face form angle, pantoscopic angle, corneal vertex distance, etc.), and/or the individual object distance model can be taken into consideration.

The monocular optical properties respectively relate to local optical properties of an individual spectacle wearer, i.e. of the first or the second spectacle lens in transmission, i.e. in the specific position of wear, without taking the respective other spectacle lens into consideration. For this reason, these optical properties are therefore referred to as "monocular" optical properties. In each evaluation point, it depends on the front and back surfaces of the respective spectacle lens and their positions with respect to each other and relative to the eye and to the object point. The at least one first monocular optical property and the at least one second monocular optical property can relate to the same or different monocular optical properties.

While for the analysis of the first monocular function the first monocular optical property, which is taken into consideration in the first monocular function, is only analyzed at the evaluation points of the first spectacle lens, the monocular optical property in the binocular function is analyzed both at evaluation points of the first spectacle lens (independent from the second spectacle lens) and at evaluation points of the second spectacle lens (independent from the first spectacle lens). The only dependence for these analyses is the choice of the binocular evaluation points of the first or the second spectacles lens, which at least partly relate to pairwise corresponding evaluation points.

The remainder function $\tilde{F}$ may depend on further optical properties. In a preferred embodiment, the remainder function is identical to zero ($\tilde{F}=0$), so that the target function merely includes the first monocular function and the binocular function with the corresponding weighting factors as addends. Preferably, the remainder function $\tilde{F}$ does not depend on the values of the first monocular optical property at the evaluation points of the first spectacle lens. In particular, the remainder function $\tilde{F}$ preferably does not explicitly depend on the first spectacle lens.

In a further preferred embodiment, $\tilde{F}$ comprises as a further addend of the target function F at least a second monocular function $F_{mono}^2$ which depends on the values of at least one further or third monocular optical property $Mon^{(m2)}$ at a multitude of evaluation points $i_2$ of the second spectacle lens. Accordingly, the binocular calculation or optimization step is preferably performed such that as a further addend in the target function according to $$F=g^{(1)}F_{mono}^{(1)}+g^{(2)}F_{mono}^{(2)}+g^{bino}F_{bino}+\tilde{F}^*,$$

a second monocular function $F_{mono}^{(2)}$ with a weighting factor $g^{(2)}$ is taken into consideration, which depends on the values of at least one third monocular optical property $Mon^{(m2)}$ at a multitude of evaluation points $i_2$ of the second spectacle lens. Particularly preferably, it $\tilde{F}^*=0$ holds for the further remainder function.

With respect to the dependencies of the individual functions on the monocular optical properties analyzed at the respective evaluation points, the target function can thus be represented preferably by $$F=g^{(1)}F_{mono}^{(1)}(Mon_1^{(m1)}(i_1))+g^{(2)}F_{mono}^{(2)}(Mon_2^{(m2)}(i_2))+g^{bino}F_{bino}(Mon_1^{(b)}(i_1^{(b)}),Mon_2^{(b)}(i_2^{(b)}))+\tilde{F}^*$$

Again, in the notation $Mon_2^{(m2)}$ for the third monocular optical property, the additional index "2" expresses that it is to be analyzed on the second spectacle lens, i.e. for an evaluation point of the second spectacle lens. The index may in particular be left out if it is clear that the analysis has to be done for the second spectacle lens. In a preferred embodiment, the at least one third monocular optical property corresponds to the at least one first monocular optical property and/or the at least one second monocular optical property, wherein merely its values at the evaluation points of the second spectacle lens are taken into account in the second monocular function.

Preferably, the binocular calculation or optimization step is performed such that in the first and/or the second monocular function according to $$F_{mono}^{(s)} = \sum_m \sum_{i_s} g_s^{(m)}(i_s)(Mon_s^{(m)}(i_s) - Mon_{s,Soll}^{(m)}(i_s))^2,$$

deviations of the values of at least one first m=m1 or third m=m2 monocular optical property $Mon_s^{(m)}$ of associated desired values $Mon_{s,Soll}^{(m)}$ at the evaluation points $i_s$ of the first (s=1) or the second (s=2) spectacle lens are taken into consideration with respective weighting factors $g_s^{(m)}(i_s)$.

Particularly preferably, the binocular calculation or optimization step is performed such that the at least one monocular optical property, which is taken into consideration in the first and/or the second monocular function, comprises the spherical equivalent $Mon^{(1)}=S_\Delta$ and/or the amount of the cylinder $Mon^{(2)}=Z_\Delta$ of the refractive deficit of the first or the second spectacle lens. In particular, the binocular calculation or optimization step is performed such that the target function is minimized with a first and/or a second monocular function $$F_{mono}^{(s)}(S_\Delta, Z_\Delta) = \sum_{i_s} (g_{S,s}(i_s)(S_\Delta(i_s) - S_{\Delta,Soll}(i_s))^2 + g_{Z,s}(i_s)(Z_\Delta(i_s) - Z_{\Delta,Soll}(i_s))^2).$$

Here and in the following, a further index for referring to the monocular optical property is in particular dispensed with if the exemplary monocular optical properties are applicable to both spectacle lenses, i.e. as the first and/or the second monocular optical property.

Preferably, the binocular calculation or optimization step is performed such that the binocular function $F_{bino}$ for each pair $(i_1^b, i_2^b)$ of binocular evaluation points depends on the difference $$Mon^{(b)}(i_1^b) - Mon^{(b)}(i_2^b)$$

between the value of the second monocular optical property $Mon^{(b)}$ at the binocular evaluation point $i_1^b$ of the first spectacle lens and the value of the second monocular optical property $Mon^{(b)}$ at the corresponding binocular evaluation point $i_2^b$ of the second spectacle lens.

Preferably, the binocular calculation or optimization step is performed such that in the binocular function according to $$F_{bino} = \sum_k \sum_i g_{bin}^{(k)}(i)\left(Bin^{(k)}(i) - Bin_{Soll}^{(k)}(i)\right)^2,$$

deviations of the values of at least one binocular optical property $Bin^{(k)}$ from associated desired values $Bin_{Soll}^{(k)}$ at evaluation points i of the first and/or the second spectacle lens are taken into consideration with respective weighting factors $g_{bin}^{(k)}(i)$, wherein the summation over the evaluation points i is performed at least over the binocular evaluation points $i_1^b$ of the first or the second spectacle lens, and the at least one binocular optical property $Bin^{(k)}$ for each binocular evaluation point $i_1^b$ of the first spectacle lens depends both on the value of the at least one second monocular optical property $Mon^{(b)}$ at the binocular evaluation point $i_1^b$ of the first spectacle lens and on the value of the at least one second monocular optical property $Mon^{(b)}$ at the corresponding binocular evaluation point $i_2^b$ of the second spectacle lens. Due to the correspondence of the binocular evaluation points, summation only takes place in particular only over pairs of binocular evaluation points. Here, each pair of corresponding binocular evaluation points can be represented as an evaluation point pair $i^b = (i_1^b, i_2^b)$, so that the summation is performed over the evaluation point pairs $i^b$.

Preferably, the method further comprises:
determining a multitude of first monocular evaluation points $i_1^m$ as the evaluation points $i_1$ of the first spectacle lens for which no corresponding evaluation point of the second spectacle lens exists in the specific situation of wear, and
associating one evaluation point $i_2$ of the second spectacle lens each as a second monocular reference point $i_2^r$ to every first monocular evaluation point $i_1^m$. Thus, in particular a monocular evaluation point pair $(i_1^b, i_2^r)$ is specified thereby. Preferably, the binocular calculation or optimization step is performed such that the summation over the evaluation points i in the binocular function $F_{bino}$ is performed over all evaluation points $i_1$ of the first spectacle lens, and wherein the at least one binocular optical property $Bin^{(k)}$ for each first monocular evaluation point $i_1^m$ of the first spectacle lens depends both on the value of the at least one second monocular optical property $Mon^{(b)}$ at the first monocular evaluation point $i_1^m$ of the first spectacle lens and on the value of the at least one second monocular optical property $Mon^{(b)}$ at the second monocular reference point $i_2^r$ of the second spectacle lens associated with said first monocular evaluation point $i_1^m$.

$$F_{bino} = \sum_k \left( \begin{array}{l} \sum_{i_1 \in GB_1} g_{Bin}^{(k)}(i_1)\left(Bin^{(k)}(i_1) - Bin_{Soll}^{(k)}(i_1)\right)^2 + \\ \sum_{\substack{i_1 \in G_1 \\ i_1 \notin GB_1}} g_{Bin}^{(k)}(i_1)\left(Bin^{(k)}(i_1) - Bin_{Soll}^{(k)}(i_1)\right)^2 \end{array} \right)$$

$$= \sum_k \left( \begin{array}{l} \sum_{i_1} g_{Bin}^{(k)}(i_1)\left(Bin^{(k)}(i_1) - Bin_{Soll}^{(k)}(i_1)\right)^2 + \\ \sum_{i_1^m} g_{Bin}^{(k)}(i_1^m)\left(Bin^{(k)}(i_1^m) - Bin_{Soll}^{(k)}(i_1^m)\right)^2 \end{array} \right)$$

By means of the thus defined transition condition at the rim of the spectacle lens, in particular due to the resulting continuity condition for the target function, an especially harmonic visual impression and transition between the central and peripheral zones of the spectacle lens with a good tolerability of the spectacle lens for use in spectacles together with the second spectacle lens are achieved.

Preferably, the method further comprises:
determining a multitude of second monocular evaluation points $i_2^m$ as the evaluation points $i_2$ of the second spectacle lens for which no corresponding evaluation point of the first spectacle lens exists in the specific situation of wear (or which do not act as corresponding evaluation points of an evaluation point of the first spectacle lens, or which do not act as binocular evaluation points), and
associating one evaluation point $i_1$ of the first spectacle lens each as a first monocular reference point $i_1^r$ to each second monocular evaluation point $i_2^m$, wherein the binocular calculation or optimization step is performed such that the summation over the evaluation points i in the binocular function $F_{bino}$ is in addition performed over the second monocular evaluation points of the second spectacle lens, and wherein the at least one binocular optical property $Bin^{(k)}$ for each second monocular evaluation point $i_2^m$ [of the second spectacle lens] depends both on the value of the at least one second monocular optical property $Mon^{(b)}$ at the second monocular evaluation point $i_2^m$ of the second spectacle lens and on the value of the at least one second monocular optical property $Mon^{(b)}$ at the first monocular reference point $i_1^r$ of the first spectacle lens associated with said second monocular evaluation point $i_2^m$. Preferably, a multitude of first $(i_1^m)$ and/or second monocular evaluation points $i_2^m$, particularly preferably every first $(i_1^m)$ and/or second monocular evaluation point $i_2^m$, is assigned the evaluation point i, which is horizontally symmetrical thereto in the situation of wear, of the second or first spectacle lens as a corresponding second $i_2^r$ or first monocular reference point $i_1^r$. In a preferred embodiment, in this context, a pair $(i_1, i_2)$ of evaluation points is considered to be horizontally symmetrical if the associated visual points have opposite coordinates in local coordinate systems of the left and/or the right spectacle lens in the horizontal direction in the specific situation of wear, i.e. opposite to a respective symmetry reference point (coordinate origin) of the first or second spectacle lens in the horizontal direction, i.e. are displaced by the same distance but in opposite directions, but in the vertical direction, in particular, have the same coordinates. Thus, for the coordinate systems exemplarily described above, it holds that $P_{1,x} = P_{2,x}$ for the x components $P_{1,x}$ and $P_{2,x}$ of the two visual points. In a preferred embodiment, the coordinate origins of the local coordinate systems are at visual points of the front surfaces of the spectacle lenses in the zero direction of sight of the right and left eyes, respectively, in the specific situation of wear. Thus, the respective symmetry reference point is preferably independent from the vertical coordinate or position of the horizontally symmetrical evaluation points or visual points. In another preferred embodiment, the origins of the two local coordinate systems, i.e. the symmetry reference points, depend on the vertical position of the visual points, namely such that the points with $P_{1,x} = 0$ for all first y values are on the principal line of sight of the first spectacle lens and the points with $P_{2,x} = 0$ for all second y values are on the principal line of sight of the second spectacle lens. Thus, horizontally symmetrical visual points have the same horizontal distance from the respective principal visual line of sight, wherein the respective symmetry reference point is the point on the principal visual line of sight with the same vertical position as the respective visual point of the pair of horizontally symmetrical visual points. Here, both visual points are shifted either nasally or temporally with respect to the symmetry reference point.

Preferably, the at least one second optical property $Mon^{(b)}$ comprises a non-prismatic optical property. The at least one second optical property $Mon^{(b)}$ thus preferably relates to at least one monocular property, which characterizes not only the prismatic power, in particular the prism difference, or depends not exclusively on the prismatic power, in particular a prism difference. In particular, the binocular function preferably not only depends on the values of a prismatic power of the first and/or the second spectacle lens, in particular a difference of prismatic powers of the first and second spectacle lenses. In a preferred embodiment, the at least one second monocular optical property comprises at least one non-prismatic, monocular optical property.

In another preferred embodiment, the calculation or optimization step is performed such that the difference of the vertical and/or the horizontal prismatic power and a vertical or horizontal prismatic reference power is taken into account in the binocular target function according to $$F_{bino} = \sum_i gP_i((PR(i) - PL(i)) - P_{soll}(i))^2 + \tilde{F}_{bino}$$

with a remainder function $\tilde{F}_{bino}$, wherein
PR(i) designates an actual vertical and/or horizontal prismatic power at the $i^{th}$ evaluation point of the right spectacle lens;
PL(i) designates an actual vertical and/or horizontal prismatic power at the $i^{th}$ evaluation point of the left spectacle lens;
$P_{soll}(i)$ designates a desired value of the difference $\Delta P$ of the vertical and/or the horizontal prismatic power between the right and the left spectacle lens at the corresponding points of the spectacle lenses specified by the $i^{th}$ evaluation points; and
$gP_i$ designates a weighting of the vertical and/or the horizontal prismatic power at the $i^{th}$ evaluation point of the spectacle lens.

In a preferred embodiment, it holds that $\tilde{F}_{bino}=0$.

The vertical and horizontal prismatic powers are defined as the respective vertical and horizontal component, respectively, of the prismatic power.

Preferably, before the binocular calculation or optimization step, the method comprises a first and/or a second monocular calculation or optimization step such that the first monocular function $F_{mono}^{(1)}$ or the second monocular function $F_{mono}^{(2)}$ is minimized.

The first or second monocular calculation or optimization step is performed such that the respective other monocular function is not taken into consideration in this step. By performing the first or second monocular calculation or optimization step in advance, a monocular, optimized first or second spectacle lens results, which serves as the preferred baseline condition for the binocular optimization in the subsequent binocular calculation or optimization step and contributes to a particularly fast and precise optimization and production of the at least one spectacle lens.

Preferably, for each binocular evaluation point $i_1^b$ of the first spectacle lens, the corresponding binocular evaluation point $i_2^b$ of the second spectacle lens is determined for the specific situation of wear by means of ray tracing assuming orthotropia.

Preferably, the method comprises a step of determining or specifying a dominant eye, wherein the spectacle lens of the pair of spectacle lenses corresponding to the dominant eye is specified as the second spectacle lens.

Preferably, the binocular calculation or optimization step comprises a first one-sided variation step such that the target function F is minimized by variation or modification of the at least one surface of the first spectacle lens, while the second spectacle lens remains unchanged. Particularly preferably, the binocular calculation or optimization step further comprises a second one-sided variation step such that the target function F is minimized by variation of at least one surface of the second spectacle lens, while the first spectacle lens remains unchanged. Preferably, the first one-sided variation step is performed prior to the second one-sided variation step.

Preferably, the binocular calculation or optimization step is performed such that the first and second one-sided variation steps are performed one after the other several times in an alternating manner. Here, one preferably starts with the first one-sided variation step.

Preferably, the binocular calculation or optimization step comprises a multitude of two-sided variation steps such that each two-sided variation step comprises:
changing or modifying at least one surface both of the first and of the second spectacle lens; and
analyzing the target function for the changed or modified spectacle lenses.

Furthermore, the disclosure herein provides a computer program product including program parts designed to, when loaded and executed on a computer, perform a method for optimizing at least one first spectacle lens for a pair of spectacle lenses for use together with a second spectacle lens of the pair of spectacle lenses in spectacles for a specific situation of wear, wherein the method for optimizing the at least one surface of the first spectacle lens comprises a binocular calculation or optimization step performed such that a target function $$F = g^{(1)}F_{mono}^{(1)} + g^{bino}F_{bino} + \tilde{F}$$

is minimized, which is defined as the sum of at least one first monocular function $F_{mono}^{(1)}$ and one binocular function $F_{bino}$ with respective weighting factors $g^{(1)}$ and $g^{bino}$, respectively, wherein the first monocular function $F_{mono}^{(1)}$ depends on the values of at least one first monocular optical property $Mon^{(m1)}$ at a multitude of evaluation points $i_1$ of the first spectacle lens, and wherein the binocular function $F_{bino}$ for a multitude of pairs $(i_1^b, i_2^b)$ of respectively one binocular evaluation point $i_1^b$ of the first spectacle lens and a, in the specific situation of wear, corresponding binocular evaluation point $i_2^b$ of the second spectacle lens depends on the values of a second monocular optical property $Mon^{(b)}$ both at the binocular evaluation point $i_1^b$ of the first spectacle lens and at the binocular evaluation point $i_2^b$ of the second spectacle lens.

In a further aspect, the disclosure herein provides a storage medium with a computer program stored thereon, wherein the computer program is designed to, when loaded and executed on a computer, perform a method for optimizing at least one first spectacle lens for a pair of spectacle lenses for use together with a second spectacle lens of the pair of spectacle lenses in spectacles for a specific situation of wear, wherein the method for optimizing the at least one surface of the first spectacle lens comprises a binocular calculation or optimization step performed such that a target function $$F = g^{(1)}F_{mono}^{(1)} + g^{bino}F_{bino} + \tilde{F}$$

is minimized, which is defined as the sum of at least one first monocular function $F_{mono}^{(1)}$ and one binocular function $F_{bino}$ with respective weighting factors $g^{(1)}$ and $g^{bino}$, respectively, wherein the first monocular function $F_{mono}^{1}$ depends on the values of at least one first monocular optical property $Mon^{(m1)}$ at a multitude of evaluation points $i_1$ of the first spectacle lens, and wherein the binocular function $F_{bino}$ for a multitude of pairs $(i_1^b, i_2^b)$ of respectively one binocular evaluation point $i_1^b$ of the first spectacle lens and a, in the specific situation of wear, corresponding binocular evaluation point $i_2^b$ of the second spectacle lens depends on the values of a second monocular optical property $Mon^{(b)}$ both at the binocular evaluation point $i_1^b$ of the first spectacle lens and at the binocular evaluation point $i_2^b$ of the second spectacle lens.

Finally, the disclosure herein provides a device for producing a spectacle lens, the device comprising:

obtaining means for obtaining target data or target specifications of a spectacle lens;

calculating and optimizing means for calculating and optimizing at least one first spectacle lens for a pair of spectacle lenses for use together with a second spectacle lens of the pair of spectacle lenses in spectacles for a specific situation of wear, wherein the method for optimizing the at least one surface of the first spectacle lens comprises a binocular calculation or optimization step performed such that a target function $$F = g^{(1)} F_{mono}^{(1)} + g^{bino} F_{bino} + \tilde{F}$$

is minimized, which is defined as the sum of at least one first monocular function $F_{mono}^{(1)}$ and one binocular function $F_{bino}$ with respective weighting factors $g^{(1)}$ and $g^{bino}$, respectively, wherein the first monocular function $F_{mono}^1$ depends on the values of at least one first monocular optical property $Mon^{(m1)}$ with respect to the target data or target specifications of the first spectacle lens at a multitude of evaluation points $i_1$ of the first spectacle lens, and wherein the binocular function $F_{bino}$ for a multitude of pairs $(i_1^b, i_2^b)$ of respectively one binocular evaluation point $i_1^b$ of the first spectacle lens and a, in the specific situation of wear, corresponding binocular evaluation point $i_2^b$ of the second spectacle lens depends on the values of a second monocular optical property $Mon^{(b)}$ both at the binocular evaluation point $i_1^b$ of the first spectacle lens and at the binocular evaluation point $i_2^b$ of the second spectacle lens.

Here, it is possible to automatically measure the target data for the at least one spectacle lens as individual prescription data of the spectacle wearer in particular together with further individual data of the spectacle wearer, in particular an individual position of wear and/or an individual object distance model, or to transfer or hand them over to the system or the device for producing a spectacle lens via a user interface as obtaining means. In particular, prescription data of the two spectacle lenses of the spectacle lens pair and/or the individual data of the spectacle wearer, the position of wear and/or the object model are sent to a device for producing a spectacle lens according to the disclosure herein by means of data remote transfer or "online". The optimization of the spectacle lens considering the anisometropia of the spectacle wearer is performed on the basis of the transmitted prescription data and/or individual data. Thus, the target data in particular provide the basis for the target or desired specifications of optical properties of the spectacle lens in particular in the individual position of wear, which are to be taken into consideration in the target function.

The optimized spectacle lenses or spectacle lens surfaces according to the disclosure herein are preferably produced from mineral glass or plastics by means of numerically controlled tools.

The disclosure herein will be described in the following on the basis of preferred embodiments with reference to the accompanying drawings, which show:

BRIEF DESCRIPTION OF THE DRAWINGS

FIG. 4 illustrates a schematic illustration of a preferred device for optimizing or producing the at least one spectacle lens according to an exemplary embodiment.

DETAILED DESCRIPTION

Figure 1A:
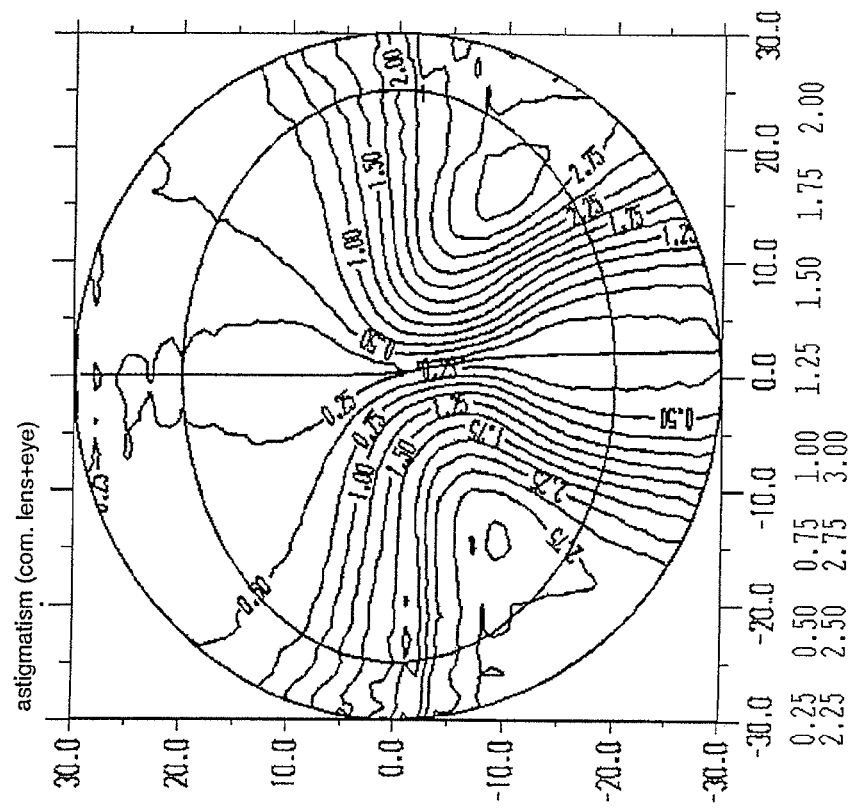
FIG. 1A illustrates isolines of the astigmatism difference for a spectacle lens in the position of wear (lens+eye), which is conventionally optimized.

For the optimization and production of spectacle lens pairs according to the disclosure herein, an optimization method is in particular used in which binocular differences of properties of wear are taken into account in a target function. According to the disclosure herein, the local optical properties of the spectacle lenses in the actual ray path of a specific situation of wear and not only the surface values are taken into consideration.

For a better understanding, a monocular optimization as e.g. described in W. Becken et al., "Optimierung der Abbildungseigenschaften unter physiologischen Aspekten", Z. Med. Phys, 1/2007, will first of all be explained. What is decisive for a full correction is conformity of the vergence matrix $S_{SK}$ of the wavefront at the vertex sphere in the ray path of wear with the corresponding matrix $S_{Ref}$ from the refraction. However, a full correction in all evaluation points of a spectacle lens at the same time is not possible in general. Thus, the difference-vergence matrix $S_\Delta = S_{SK} - S_{Ref}$ of the refractive deficit is to be minimized, which means a minimization of its spherical equivalent $S_\Delta$ and its cylinder $Z_\Delta$ (they correspond to the mean value or difference of the eigenvalues of the difference-vergence matrix $S_\Delta$). For the stability of the optimization, it has turned out to be advantageous to already specify finite values $S_{\Delta,Soll}$ and $Z_{\Delta,Soll}$ of $S_\Delta$ and $Z_\Delta$ as target specifications (the so-called desired specifications), so that the optimization is directed the minimization of the following (monocular) target function:

$$F_{mono} = \sum_i g_Z(i)(Z_\Delta(i) - Z_{\Delta,Soll}(i))^2 + g_S(i)(S_\Delta(i) - S_{\Delta,Soll}(i))^2 \quad (1)$$

Here, the sum preferably spans the more than 10000 evaluation points i of the spectacle lens to be optimized, wherein $g_Z(i)$ and $g_S(i)$ designate local weights or weighting factors.

According to a preferred embodiment of the disclosure herein, now if K ($K \geq 1$ is an integer) binocular properties $Bin^{(k)}$, $k=1, \ldots, K$ are specified (which will be detailed in the following on the basis of preferred embodiments), the target function for a binocular calculation or optimization step of at least one surface of a first spectacle lens preferably is the function $$F = g^r F_{mono}^r + g^l F_{mono}^l + g^{bino} F_{bino} \quad (2)$$

wherein $g^{(1)} = g^r$, $g^{(2)} = g^l$ and $g^{bino}$ designate weights or weighting factors and $F_{mono}^{(1)} = F_{mono}^r$ and $F_{mono}^{(2)} = F_{mono}^l$ designate a first or right and a second or left monocular function. Preferably, the monocular functions are provided by analogy with equation (1), i.e. in particular:

$$F_{mono}^r = \sum_{i_r \in G_r} g_{Z,r}(i_r)(Z_\Delta(i_r) - Z_{\Delta,Soll}(i_r))^2 + g_{S,r}(i_r)(S_\Delta(i_r) - S_{\Delta,Soll}(i_r))^2 \quad (3)$$

$$F_{mono}^l = \sum_{i_l \in G_l} g_{Z,l}(i_l)(Z_\Delta(i_l) - Z_{\Delta,Soll}(i_l))^2 + g_{S,l}(i_l)(S_\Delta(i_l) - S_{\Delta,Soll}(i_l))^2$$

The analysis of the two monocular functions in equation (3) is done separately, wherein the index $i_r$ in $F_{mono}^r$ runs over all evaluation points in the right lens ($i_r \in G_r$) and the index $i_l$ in $F_{mono}^l$ over all points in the left lens ($i_l \in G_l$).

In a preferred embodiment, the binocular function is specified by $$F_{bino} = \sum_k \left\{ \begin{array}{l} \sum_{i_r \in GBr} g_{Bin}^{(k)}(i_r)\left(Bin^{(k)}(i_r) - Bin_{Soll}^{(k)}(i_r)\right)^2 + \\ \sum_{\substack{i_r \in G_r \\ i_r \notin GB_r}} g_{Bin}^{(k)}(i_r)\left(Bin^{(k)}(i_r) - Bin_{Soll}^{(k)}(i_r)\right)^2 + \\ \sum_{\substack{i_l \in G_l \\ i_l \notin GB_l}} g_{Bin}^{(k)}(i_l)\left(Bin^{(k)}(i_l) - Bin_{Soll}^{(k)}(i_l)\right)^2 \end{array} \right\} \quad (4)$$

wherein the index k runs over all binocular properties to be taken into consideration and the indices $i_r$, $i_l$ run over all evaluation points. The variables $Bin^{(k)}$ are binocular properties (see below and table 2), and $Bin_{Soll}^{(k)}$ are the desired specifications or local desired values thereof. Moreover, $g_{Bin}^{(k)}$ are local binocular weighting functions depending on the evaluation points. In the designations $g_{Bin}^{(k)}(i_l)$, $Bin^{(k)}(i_l)$, $Bin_{Soll}^{(k)}(i_l)$, the argument ($i_l$) in particular represents an abbreviation for the pair of points $(P_l(i_l), P_r(i_l))$ of a point $P_l$ on the left lens and a point $P_r$ on the right lens, wherein both points can be specified by the left index $i_l$. Accordingly, the argument ($i_r$) in particular represents such a pair of points $(P_l(i_r), P_r(i_r))$ which can already be specified by the right index $i_r$ alone. Optionally, the points can e.g. be on the front surface or the back surface.

The pair of points $(P_l, P_r)$ designates the points on the respective spectacle lens for which monocular properties are to be compared in particular in both lenses. Now, different regions are to be particularly distinguished on the lenses:

a) the binocularly calculatable regions $GB_r$ and $GB_l$: Each pair of points $(P_l, P_r)$, for which $P_l$ is the penetration point of the left principal ray on the left lens and $P_r$ is the penetration point of the right principal ray on the right lens, wherein both principal rays are characterized in that they intersect on an object surface to be determined in the object space, is called a corresponding pair of points. The region with points $P_l$ on the left lens, for which a corresponding point $P_r$ can be found on the right lens, is called the binocularly calculatable region $GB_l$ of the left lens. The corresponding region in the right lens is called the binocularly calculatable region $GB_r$ of the right lens. The discrete set of grid indices $i_l$, $i_r$, for which the points $P_l(il)$ and $P_r(ir)$ lie in $GB_l$ and $GB_r$, respectively, are also referred to as $GB_l$ and $GB_r$, respectively.

b) the non-binocularly calculatable region in the left lens, i.e. $i_l \in G_l$, but $i_l \notin GB_l$ c) the non-binocularly calculatable region in the right lens, i.e. $i_r \in G_r$, but $i_r \notin GB_r$ Now, the first summation in equation (4) relates to points in the binocularly calculatable region a). Preferably, first of all the right index $i_r$ is set and $P_r$ is determined therefor, and the associated point on the object surface is determined. Subsequently, in a principal ray iteration, a second principal ray and $P_l$ are calculated, whereby the pair or points $(P_l(i_r), P_r(i_r))$ is set depending on $i_r$. Alternatively, by analogy, the pair of points $(P_l(il), P_r(il))$ can also be determined depending on the left index il. In both cases, the summation in equation (4) sweeps the entire binocularly calculatable region. Without a general limitation, the first summation is expressed by ir∈GBr in the following.

Now, the second summation in equation (4) relates to points in the non-binocularly calculatable region of the left lens, region b). This contribution to the binocular function does not directly relate to binocular vision, but is advantageous for obtaining a particularly advantageous transition of the target function at the rim of the binocular region for the sake of tolerability of the spectacle lens or the spectacle lenses. Preferably, the point $P_l(il)$ is determined for the given index $i_r$, and instead of the corresponding point (which does not exist), that point $P_r(i_l)$ that is horizontally symmetrical with respect to $P_l(i_l)$ is selected.

Finally, the third summation in equation (4) relates to points in the non-binocularly calculatable region c) of the right lens, which are counted by the index $i_r$.

According to a preferred embodiment, the binocular properties $Bin^{(k)}(i)$ (wherein the index i is used instead of $i_l$, $i_r$ in the following) are defined as follows: The values of the binocular optical property $Mon_r^{(q)}(i) := Mon_r^{(q)}(P_r(i))$, $Mon_l^{(q)}(i) := Mon_l^{(q)}(P_l(i))$, q=1, ..., Q are calculated at the two points $P_l(i)$, $P_r(i)$ per Q (Q≥1 is an integer) for the evaluation point i. As the binocular optical property $Bin^{(k)}(i)$, preferably a function $$Bin^{(k)}(i) = f^{(k)}(Mon_r^{(1)}(i), Mon_r^{(2)}(i), \ldots, Mon_r^{(Q)}(i), Mon_l^{(1)}(i), Mon_l^{(2)}(i), \ldots, Mon_l^{(Q)}(i)) \quad (5)$$

of this monocular property is specified, which takes at least one monocular property of each side into consideration, which really depends on at least one of $Mon_r^{(q)}(i)$ and at least one of $Mon_l^{(q)}(i)$. The function $f^{(k)}$ may, but not necessarily has to, be the difference of two monocular properties, e.g. $Bin^{(k)}(i) = Mon_l^{(1)}(i) - Mon_r^{(1)}(i)$.

Preferably, the binocular optical property $Bin^{(k)}$ is one of the variables that can be formed from the left and right results of the matrix $S_\Delta$ of the monocular refractive deficit, the monocular magnification matrix N and/or the monocular prism Pr.

With the preferred parameterization $$S_\Delta = \begin{pmatrix} S_{xx} & S_{xy} \\ S_{xy} & S_{yy} \end{pmatrix}, \quad N = \begin{pmatrix} N_{xx} & N_{xy} \\ N_{xy} & N_{yy} \end{pmatrix}, \quad Pr = \begin{pmatrix} Pr_h \\ Pr_v \end{pmatrix} \quad (6)$$

table 1 shows new exemplary, preferred monocular optical properties, which may be taken into account in the target function as at least a first, second and/or third monocular optical properties.

| q | Formula | Designation |
|---|---------|-------------|
| 1 | $\text{Mon}_r^{(1)} = S_{\Delta,r} = \frac{1}{2}(S_{xx,r} + S_{yy,r})$ | Spherical equivalent of the monocular refractive deficit |
| 2 | $\text{Mon}_r^{(2)} = Z_{\Delta,r} = \sqrt{(S_{xx,r} - S_{yy,r})^2 + 4S_{xy,r}^2}$ | Cylinder of the monocular refractive deficit |
| 3 | $\text{Mon}_r^{(3)} = \alpha_{\Delta,r} = \frac{1}{2}\arctan\frac{2S_{xy,r}}{S_{x,r} + S_{y,r}}$ | Cylinder axis of the monocular refractive deficit |
| 4 | $\text{Mon}_r^{(4)} = N_r = \frac{1}{2}\sqrt{(N_{xy,r} - N_{yx,r})^2 + (N_{xx,r} + N_{yy,r})^2}$ | Mean monocular magnification |
| 5 | $\text{Mon}_r^{(5)} = Z_r = \frac{1}{2}\sqrt{(N_{xy,r} + N_{yx,r})^2 + (N_{xx,r} - N_{yy,r})^2}$ | Mean monocular distortion |
| 6 | $\text{Mon}_r^{(6)} = \psi_{N,r}$ $= \frac{1}{2}\arctan\frac{2(N_{xx,r}N_{xy,r} + N_{yx,r}N_{yy,r})}{N_{xx,r}^2 - N_{xy,r}^2 + N_{yx,r}^2 - N_{yy,r}^2}$ | Monocular principal magnification direction |
| 7 | $\text{Mon}_r^{(7)} = \psi_{T,r} = \arctan\frac{N_{xy,r} - N_{yx,r}}{N_{xx,r} + N_{yy,r}}$ | Monocular torsion angle |
| 8 | $\text{Mon}_r^{(8)} = \text{Pr}_{h,r}$ | Monocular horizontal prism |
| 9 | $\text{Mon}_r^{(9)} = \text{Pr}_{v,r}$ | Monocular vertical prism |

The spherical equivalent $S_\Delta$ represents the mean value of the eigenvalues of $S_\Delta$. Thus, the value $Z_\Delta$ of the cylinder corresponds to the difference of the eigenvalues of $S_\Delta$. The angle $\alpha_\Delta$ represents the direction of one of the eigenvectors of $S_\Delta$. In particular, with $S_\Delta$, $Z_\Delta$ and $\alpha_\Delta$, the three degrees of freedom of the symmetrical matrix $S_\Delta$ are fully characterized. The magnification matrix N is i.a. asymmetrical and thus has one degree of freedom more than the symmetrical matrix $S_\Delta$. The torsion angle is particularly defined such that the product $R(\psi_T)N$ is symmetric with the rotation matrix $R(\psi_T)=((\cos \psi_T, -\sin \psi_T),(\sin \psi_T, \cos \psi_T))$. The procedure with this product is the same as with $S_\Delta$, i.e. N is the mean value of the eigenvalues of $R(\psi_T)N$, Z is the difference thereof, and $\psi_N$ is the direction of one of the eigenvectors of $R(\psi_T)N$.

The following illustrates a number of preferred binocular functions $\text{Bin}^{(k)}$. They can in particular be represented as functions of (i.e. depending on) values of the above-described preferred monocular functions $\text{Mon}^{(q)}$, wherein the index q serves as a reference to the above, exemplarily selected numbering of the monocular functions only and apart from that is not of limiting significance. In particular, this does not mean an order or weighting of the monocular functions necessary for the disclosure herein.

It has turned out to be practical to form the binocular left-right differences not only according to the property in accordance with table 1, but also by specific combinations of these properties, which can be easily interpreted. If one calculates the matrices $S_{\Delta,r}$ and $S_{\Delta,l}$, determined by the first three properties, for the refractive deficit in the evaluation points $P_r(i)$ and $P_l(i)$, respectively, one can therefrom form the binocular difference matrix $\Delta S_\Delta = S_{\Delta,l} - S_{\Delta,r}$ of the refractive deficit and therefrom calculate varuabkes $S_{\Delta,lr}$, $Z_{\Delta,lr}$, $\alpha_{\Delta,lr}$ by analogy with $S_\Delta$, $Z_\Delta$, $\alpha_\Delta$ (see $\text{Bin}^{(1)}$ to $\text{Bin}^{(3)}$ in table 2). In another preferred embodiment, the smaller or the larger principal meridians are subjected to a left-right comparison ($\text{Bin}^{(4)}$ or $\text{Bin}^{(5)}$). In a further preferred embodiment, the norm of the difference matrix $\Delta S_\Delta$ is formed ($\text{Bin}^{(6)}$) and/or the cylinder values and/or the cylinder axes are directly compared ($\text{Bin}^{(7)}$ and/or $\text{Bin}^{(8)}$). A direct comparison of the spherical equivalents (sometimes referred to as "refractive imbalance") is already represented by $\text{Bin}^{(1)}$.

For the comparison of the left and right magnification matrices, there are more possibilities due to their asymmetries. Particularly preferred is the direct difference calculation of magnification, distortion, principal magnification direction and/or torsion ($\text{Bin}^{(9)}$ to $\text{Bin}^{(12)}$). Alternatively or in addition, the symmetrical proportions of both magnification matrices are determined, the difference matrix $R(\psi_{T,l})N_l - R(\psi_{T,r})N_r$ is formed therefrom, and the mean value of the eigenvalues, the difference thereof and/or the principal direction is formed from said difference matrix by analogy with $\Delta S_\Delta$ and is taken into account in the binocular function. The mean value of the eigenvalues is already given by $\text{Bin}^{(9)}$, the two other variables correspond to $\text{Bin}^{(13)}$ and $\text{Bin}^{(14)}$. By analogy with $\text{Bin}^{(6)}$, the norm of the difference matrix $N_l - N_r$ is formed in another preferred embodiment ($\text{Bin}^{(15)}$).

In another preferred embodiment, the magnification quotient matrix is formed by $$N^Q = N_l N_r^{-1} = \begin{pmatrix} N_{xx}^Q & N_{xy}^Q \\ N_{yx}^Q & N_{yy}^Q \end{pmatrix}, \quad (7)$$

in order to compare the left and right magnification matrices. The magnification quotient matrix is equal to the identity matrix if both magnification matrices are identical. For the magnification quotient matrix $N^Q$, magnification, distortion, position or the principal magnification direction and/or torsion are determined preferably by analogy with N ($\text{Bin}^{(16)}$ to $\text{Bin}^{(19)}$) and taken into account in the binocular function correspondingly. If both magnification matrices $N_l$ and $N_r$ are equal, then $N^Q = 1$ is the identity matrix and its magnification is 1, its distortion 0, its principal direction undefined, and its torsion 0.

In a further preferred embodiment, from the prisms of the monocular optical properties, the horizontal vergence position and/or the vertical prism difference ($\text{Bin}^{(20)}$ to $\text{Bin}^{(21)}$)

are alternatively or in addition taken into account in the binocular function as binocular optical properties. Thereby, a spectacle lens or a pair of spectacle lenses for use in spectacles for the correction of anisometropia can be optimized or produced in a particularly preferred manner taking the anisometropia into consideration.

TABLE 2

Binocular variables which according to preferred embodiments are taken into consideration in the binocular function alternatively or in combination.

| Formula | $\text{Mon}_{rechts}^{(q)}$, $\text{Mon}_{links}^{(q)}$ | Designation |
|---|---|---|
| $\text{Bin}^{(1)} = S_{\Delta,lr} = S_{\Delta,l} - S_{\Delta,r}$ | $q = 1$ | Spherical equivalent of the binocular refractive imbalance |
| $\text{Bin}^{(2)} = Z_{\Delta,lr} = \sqrt{Z_{\Delta,l}^2 + Z_{\Delta,r}^2 - 2Z_{\Delta,l}Z_{\Delta,r}\cos 2(\alpha_{\Delta,l} - \alpha_{\Delta,r})}$ | $q = 2, 3$ | Cylinder of the binocular refractive imbalance (astigmatic difference) |
| $\text{Bin}^{(3)} = \alpha_{\Delta,lr} = \frac{1}{2}\arctan\frac{Z_{\Delta,l}\sin 2\alpha_{\Delta,l} - Z_{\Delta,r}\sin 2\alpha_{\Delta,r}}{Z_{\Delta,l}\cos 2\alpha_{\Delta,l} - Z_{\Delta,r}\cos 2\alpha_{\Delta,r}}$ | $q = 2, 3$ | Cylinder axis of the binocular refractive imbalance |
| $\text{Bin}^{(4)} = S_{\Delta,lr}^- = \left(S_{\Delta,l} - \frac{1}{2}Z_{\Delta,l}\right) - \left(S_{\Delta,r} - \frac{1}{2}Z_{\Delta,r}\right)$ | $q = 1, 2$ | Binocular imbalance in the smaller principal meridian |
| $\text{Bin}^{(5)} = S_{\Delta,lr}^+ = \left(S_{\Delta,l} + \frac{1}{2}Z_{\Delta,l}\right) - \left(S_{\Delta,r} + \frac{1}{2}Z_{\Delta,r}\right)$ | $q = 1, 2$ | Binocular imbalance in the larger principal meridian |
| $\text{Bin}^{(6)} = A_{\Delta,lr} = \sqrt{(S_{xx,l} - S_{xx,r})^2 + (S_{yy,l} - S_{yy,r})^2 + 2(S_{xy,l} - S_{xy,r})^2}$ | $q = 1, 2, 3$ | Binocular dioptric distance between left and right refractive deficits |
| $\text{Bin}^{(7)} = \Delta Z_\Delta = |Z_{\Delta,l} - Z_{\Delta,r}|$ | $q = 2$ | Amount of the binocular cylinder difference |
| $\text{Bin}^{(8)} = \Delta\alpha_\Delta = \alpha_{\Delta,l} - \alpha_{\Delta,r}$ | $q = 3$ | Binocular cylinder axis difference |
| $\text{Bin}^{(9)} = \Delta N = N_l - N_r$ | $q = 4$ | Binocular magnification difference |
| $\text{Bin}^{(10)} = \Delta Z = Z_l - Z_r$ | $q = 5$ | Binocular distortion difference |
| $\text{Bin}^{(11)} = \Delta\psi_N = \psi_{N,l} - \psi_{N,r}$ | $q = 6$ | Binocular difference of the principal magnification directions |
| $\text{Bin}^{(12)} = \Delta\psi_T = \psi_{T,l} - \psi_{T,r}$ | $q = 7$ | Binocular torsion difference |
| $\text{Bin}^{(13)} = Z_{lr} = \sqrt{Z_l^2 + Z_r^2 - 2Z_l Z_r \cos 2(\psi_{N,l} - \psi_{N,r})}$ | $q = 5, 6$ | Distortion of the binocular difference $R(\psi_{T,l})N_l - R(\psi_{T,r})N_r$ of the symmetrical proportions of the magnification matrices |
| $\text{Bin}^{(14)} = \psi_{N,lr} = \frac{1}{2}\arctan\frac{Z_l\sin 2\psi_{N,l} - Z_r\sin 2\psi_{N,r}}{Z_l\cos 2\psi_{N,l} - Z_r\cos 2\psi_{N,r}}$ | $q = 5, 6$ | Principal direction of the binocular difference $R(\psi_{T,l})N_l - R(\psi_{T,r})N_r$ of the symmetrical proportions of the magnification matrices |
| $\text{Bin}^{(15)} = A_{N,lr} = \sqrt{(N_{xx,l} - N_{xx,r})^2 + (N_{yy,l} - N_{yy,r})^2 + 2(N_{xy,l} - N_{xy,r})^2}$ | $q = 4, 5, 6, 7$ | Binocular difference norm between left and right magnification matrices |
| $\text{Bin}^{(16)} = N^Q = \frac{1}{2}\sqrt{\left(N_{xy}^Q - N_{yx}^Q\right)^2 + \left(N_{xx}^Q + N_{yy}^Q\right)^2}$ | $q = 4, 5, 6$ | Magnification of the magnification quotient matrix |
| $\text{Bin}^{(17)} = Z^Q = \frac{1}{2}\sqrt{\left(N_{xy}^Q + N_{yx}^Q\right)^2 + \left(N_{xx}^Q - N_{yy}^Q\right)^2}$ | $q = 4, 5, 6$ | Distortion of the magnification quotient matrix |

TABLE 2-continued

| | | |
|---|---|---|
| $\text{Bin}^{(18)} = \psi_N^Q$ $= \frac{1}{2}\arctan\frac{2(N_{xx}^Q N_{xy}^Q + N_{yx}^Q N_{yy}^Q)}{\left(N_{xx}^Q\right)^2 - \left(N_{xy}^Q\right)^2 + \left(N_{yx}^Q\right)^2 - \left(N_{yy}^Q\right)^2}$ | q = 4, 5, 6, 7 | Principal magnification direction of the magnification quotient matrix |
| $\text{Bin}^{(19)} = \psi_T^Q = \arctan\frac{N_{xy}^Q - N_{yx}^Q}{N_{xx}^Q + N_{yy}^Q}$ | q = 4, 5, 6, 7 | Torsion of the magnification quotient matrix |
| $\text{Bin}^{(20)} = \Delta\text{Pr} = \text{Pr}_{h,l} - \text{Pr}_{h,r}$ | q = 8 | Horizontal prism difference, horizontal vergence position |
| $\text{Bin}^{(21)} = \Delta\text{Pr} = \text{Pr}_{v,l} - \text{Pr}_{v,r}$ | q = 9 | Vertical prism difference |

In a preferred embodiment, the binocular calculation or optimization step is performed such that the first and/or the second spectacle lens (i.e. optionally the front and/or the back surface) are specified by $n_l$ spline coefficients in the left lens and $n_r$ spline coefficients in the right lens, wherein the spline grid may be at the evaluation points, but does not have to be.

Preferably, the starting condition for each lens (in particular for each lens varied in the binocular optimization) is assumed to be a monocularly favorable condition. Particularly suitable is a lens optimized monocularly in advance according to the target function in equation (1).

In a preferred embodiment, the binocular calculation or optimization step comprises a one-sided binocular optimization. This is particularly preferred if one eye is preferred by the spectacle wearer (a dominant eye). Here, preferably only the lens on the other side is changed and it is accepted that the monocular properties thereof worsen if the binocular properties can be improved thereby. Exemplarily, the $n_l$ coefficients of the left lens are maintained, while the $n_r$ coefficients of the right lens are changed such that the target function in equation (2) is minimized thereby.

Since in a one-sided optimization of the right lens the contribution of the left-side monocular target function $F_{mono}^l$ is constant with respect to F in equation (2), it can also be left out, so that instead of equation (2), optimization may take place according to the target function $$F = g^r F_{mono}^r + g^{bino} F_{bino} \quad (8)$$

without changing the result for the lenses.

In a further preferred embodiment, instead of the binocular function of equation (4), $$F_{bino} = \sum_k \left( \begin{array}{c} \sum_{i_r \in GBr} g_{Bin}^{(k)}(i_r)\left(\text{Bin}^{(k)}(i_r) - \text{Bin}_{Soll}^{(k)}(i_r)\right)^2 + \\ \sum_{\substack{i_r \in G_r \\ i_r \notin GB_r}} g_{Bin}^{(k)}(i_r)\left(\text{Bin}^{(k)}(i_r) - \text{Bin}_{Soll}^{(k)}(i_r)\right)^2 \end{array} \right) \quad (9)$$

is used as a binocular function in the target function of equation (8) or equation (2).

In a further preferred embodiment of the present disclosure, the binocular calculation or optimization step comprises a two-sided, simultaneous binocular optimization without constraints. In particular, in the binocular optimization performed according to equation (2), all $n_l + n_r$ spline coefficients are changed simultaneously, wherein preferably a Newton search algorithm (or a different method) is used to minimize the target function. Here, the designation "without constraints" means that really all $n_l + n_r$ spline coefficients are independent from one another. This is particularly advantageous if the two spectacle lenses are different, such as in the case of anisometropia. In the case of isometropia, an independent optimization of both lenses can be used e.g. to deal with specific monocular properties on one side differently than on the other side by means of different weights. The variations of the target functions of equations (8) and (9) are not suitable for the two-sided, simultaneous binocular optimization without constraints, since both lenses are varied.

In a further preferred embodiment of the present disclosure, the binocular calculation or optimization step comprises a two-sided, simultaneous binocular optimization with constraints. In particular, in a preferred embodiment, the left and right spectacle lenses are optimized or produced in a mirror-symmetrical manner. In this case, preferably $n_l = n_r$, and the spline coefficients of the left lens are identical with those of the right lens. Preferably, the left monocular desired specifications or desired values and weights are equated with the right ones as well. Then, in the target function in equation (2) $F_{mono}^l = F_{mono}^r$, and in the binocular target function in equation (4) the second and third subtotals are identical. In this special case, all two variations of the target functions according to equations (8) and (9) do not change the result with respect to equations (2, 4). For reasons of symmetry, i.e. due to $g^l F_{mono}^l = g^r F_{mono}^r$ and due to the conformity of the second and third summations in equation (4), these variations are equivalent to the original target functions in equations (2, 4) if one puts $g^l \to g^l/2$, $g^r \to g^r/2$ and $g_{Bin}^{(k)}(i_r) \to g_{Bin}^{(k)}(i_r)/2$ for $i_r \in GB_r$ in equations (2) and (4), respectively. As a starting state for the binocular optimization with constraints, preferably a single, monocularly favorable or optimized lens is provided. A lens monocularly optimized according to equation (1) is particularly suitable.

In a further preferred embodiment of the present disclosure, the binocular calculation or optimization step comprises a two-sided, sequential binocular optimization. Therewith, both spectacle lenses can be optimized, wherein for the calculation or optimization step the large number of degrees of freedom of the optimization problem is to be reduced by performing a one-sided binocular optimization according to the target function in equation (2) and in equation (4), alternately left and right as an alternative. Each one-sided optimization process, i.e. each sequence, can either run until the value of the target function in this sequence does not change any more, or can be cancelled prematurely if the changes fall under a specific cancellation criterion. The calculation or optimization and production can be noticeably accelerated by reducing the free parameters.

Preferably, the alternation of left and right-side optimization is continued until the result does not change any more. This final result differs from that of the two-sided, simultaneous binocular optimization without constraints, but represents a good approximation if the number of steps for the individual sequences is suitably chosen. Preferably, the method comprises a step of determining or specifying a dominant eye. Particularly preferably, the sequential optimization is started with a modification or binocular optimization of the spectacle lens that faces away from the dominant eye. In particular, the changes in the first optimization step of the sequence are strongest. The change of the dominant eye with respect to the monocular optimum takes place in the second sequence and is correspondingly weaker.

In a further preferred embodiment of the present disclosure, the binocular calculation or optimization step comprises a two-sided, sequential binocular optimization with modified target function. By analogy with the one-sided binocular optimization, the target function according to equations (8, 9) is modified.

FIGS. 1A to 3B show an example of a two-sided, simultaneous binocular optimization with constraints. These FIGS. 1 to 8 relate to a Cartesian coordinate system which is tangential to the front surface of the spectacle lens and the origin of which is preferably in the zero direction of sight in front of the corresponding eye. The x-y plane is preferably tangential to the front surface in the prism reference point or geometrical center; all coordinate values x and y are indicated in mm. The individual figures show isolines of the illustrated variables.

In particular, it concerns an optimization or production of a progressive spectacle lens pair for use with isometropia. In particular, it concerns a minus-power lens with the prescription sph=−7.0 D. As boundary conditions, preferably the coefficients of the to-be-optimized surfaces of the left and right spectacle lenses are equated as described above.

Figure 1B:
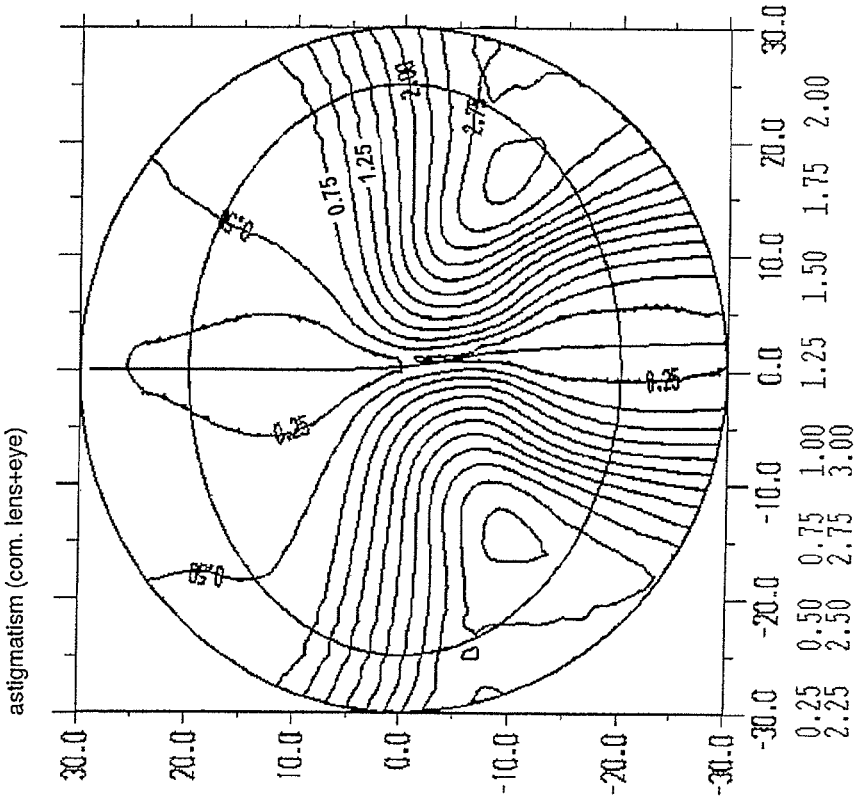
FIG. 1B illustrates isolines of the astigmatism difference for a spectacle lens in the position of wear (lens+eye), which is optimized according to an exemplary embodiment.
Figure 2A:
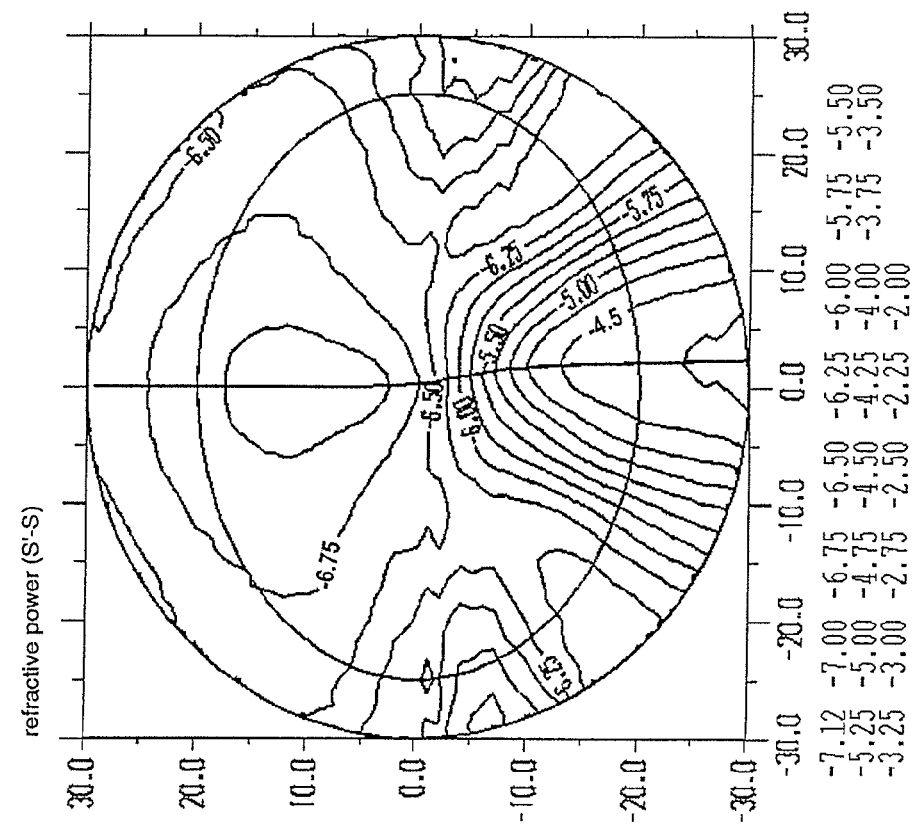
FIG. 2A illustrates isolines of the refractive power difference for a spectacle lens in the position of wear (lens+eye), which is conventionally optimized.
Figure 2B:
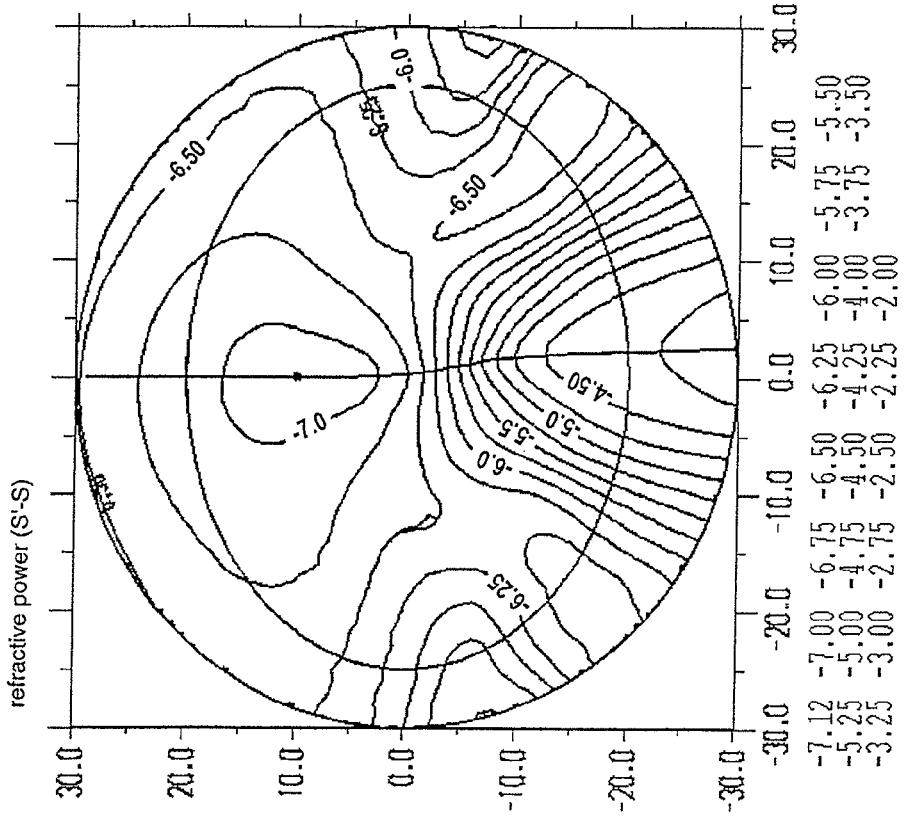
FIG. 2B illustrates isolines of the refractive power difference for a spectacle lens in the position of wear (lens+eye), which is optimized according an exemplary embodiment.
Figure 3A:
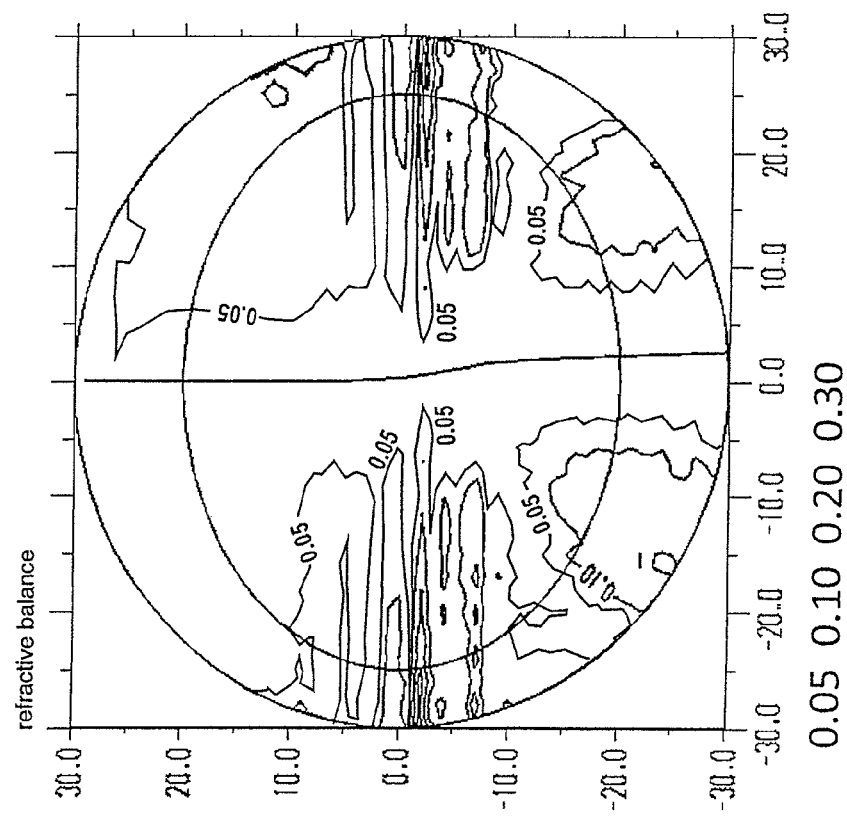
FIG. 3A and illustrates isolines of the refractive imbalance for a spectacle lens in the position of wear (lens+eye), which is conventionally optimized.
Figure 3B:
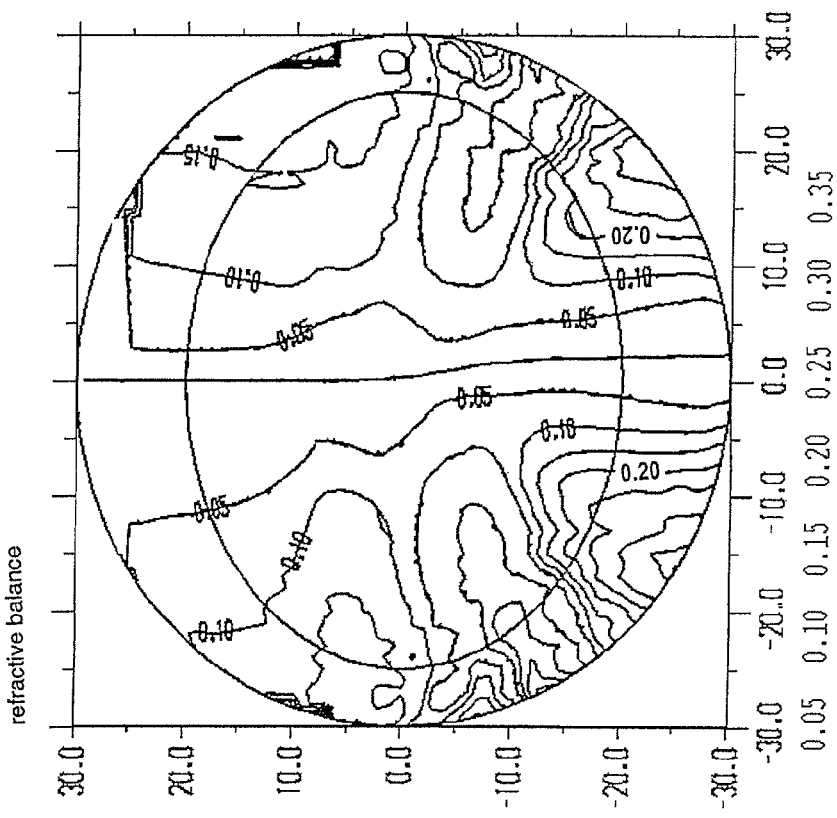
FIG. 3B illustrates isolines of the refractive imbalance for a spectacle lens in the position of wear (lens+eye), which is optimized according to an exemplary embodiment.

First of all, a monocular optimization is performed by minimizing the target function illustrated in equation (1). The resulting monocularly optimized spectacle lens forms the basis for a binocular optimization, wherein in the binocular function according to equation (9) the refractive imbalance is taken into consideration as the binocular optical property $Bin^{(1)}=S_{\Delta,lr}=S_{\Delta,l}-S_{\Delta,r}$ according to table 2. The monocular optical properties refractive power and astigmatism for the combination of spectacle lens and eye in the specific situation of wear are illustrated in FIG. 1 (astigmatism) and FIG. 2 (refractive power) for the only monocularly optimized spectacle lens (FIGS. 1A and 2A) and the spectacle lens optimized according to the disclosure (FIGS. 1A and 2A). Furthermore, FIG. 3 shows the binocular optical property $Bin^{(1)}=S_{\Delta,lr}=S_{\Delta,l}-S_{\Delta,r}$ for the conventionally optimized spectacle lens (FIG. 3A) and the spectacle lens optimized according to the disclosure (FIG. 3B). While in the conventional spectacle lens (FIG. 3A), values for the refractive imbalance of $S_{\Delta,lr}>0.15$ dpt occur in the distance portion and regions with even $S_{\Delta,lr}>0.3$ dpt occur in the near portion, the maximally occurring values of the refractive imbalance of $S_{\Delta,lr}\leq 0.08$ dpt in the distance portion and $S_{\Delta,lr}\leq 0.15$ dpt in the near portion are reduced by the optimization according to the disclosure, whereby the imaging properties and the tolerability of the spectacle lens for use in the spectacles are significantly improved.

Preferably, the visual points, corresponding to the $i^{th}$ evaluation points, of the second spectacle lens, are calculated by means of ray tracing assuming the orthotropia in the situation of wear of the first spectacle lens and the second spectacle lens in front of the eyes of the spectacle wearer. In doing so, in particular the course of a first principal ray and the associated wavefront are calculated. The first principal ray is preferably defined as the ray that passes from the ocular center of rotation of the first (e.g. right) eye through a penetration point on the front or back surface of the (e.g. right) spectacle lens to be optimized to a predetermined object point. The penetration point of the first principal ray with the front or back surface of the spectacle lens to be optimized represents the $i^{th}$ evaluation point. The calculation of the wavefront is preferably performed by means of wavefront tracing.

Subsequently, the course of a second principal ray is iterated assuming intersecting visual axes (orthotropia), and subsequently the wavefront associated with the second principal ray is calculated. The second principal ray is preferably defined as the ray that passes through the predetermined object point, the second (e.g. left) spectacle lens, and the ocular center of rotation of the second (e.g. left) eye.

The penetration point of the second principal ray with the front or back surface of the second spectacle lens represents the visual point, corresponding to the $i^{th}$ evaluation point, of the second spectacle lens.

From the data of the wavefront there can be determined the monocular optical properties, such as astigmatic deviation and the refractive error of the wavefront at the $i^{th}$ evaluation point of the first or second spectacle lens in the specific situation of wear. The astigmatic deviation represents the difference of the actual astigmatism of the spectacle lens and the required (desired) astigmatism. Also, the refractive error represents the difference of the actual refractive power of the spectacle lens and the required (desired) refractive power. Preferably, the astigmatic difference represents the difference (according to the method of obliquely crossed cylinders or cross-cylinder method, as described e.g. in US 2003/0117578) of the thus calculated deviations of the first and second spectacle lenses each. According to the cross-cylinder method, the difference in cylinder or astigmatism of the left and right spectacle lenses is preferably calculated as follows:

$$zyl_x = zyl_R \cdot \cos(2 \cdot A_R) - zyl_L \cdot \cos(2 \cdot A_L)$$
$$zyl_y = zyl_R \cdot \sin(2 \cdot A_R) - zyl_L \cdot \sin(2 \cdot A_L)$$
$$zyl_{Dif} = \sqrt{zyl_x^2 + zyl_y^2}$$
$$A_{Dif} = \mathrm{atan}\left(\frac{zyl_y}{zyl_x}\right)$$

wherein:
$zyl_R$ designates the amount of the cylinder of the right spectacle lens;
$A_R$ designates the cylinder axis of the cylinder of the right spectacle lens;
$zyl_L$ designates the amount of the cylinder of the left spectacle lens;
$A_L$ designates the cylinder axis of the cylinder of the left spectacle lens;
$zyl_{Dif}$ designates the amount of the resulting cylinder; and
$A_{Dif}$ designates the cylinder axis of the resulting cylinder.

The refractive balance represents the absolute value of the difference of the mean power of the spectacle lens to be optimized and the second spectacle lens.

A vertical prism difference preferably arises by projecting the eye-side principal rays into the cyclopean eye plane and by expressing the angle between the straight lines in cm/m. The cyclopean eye plane is the plane that passes through the point in the middle of the straight line, which connects the ocular centers of rotation of the two eyes, and is perpendicular to said straight line.

The two eyes can be average model eyes (e.g. Gullstrand's schematic eyes) arranged in an average position of wear (e.g. according to DIN 58208 part 2). Alternatively, the two eyes can be model eyes that take the individual parameters of a spectacle wearer into account and are arranged in a predetermined (individual) position of wear. Further, with respect to the definition of cyclopean eye or the cyclopean eye coordinates, reference is made to the textbook "Refraktionsbestimmung" by Heinz Diepes, vol. 3 DOZ Verlag, Heidelberg 2004, pages 74 to 75, and to the textbook "Binokular Vision and Stereopsis" by Ian P. Howard, Brian J. Rogers, Oxford University Press, 1995, pages 38 to 39, page 560 verwiesen.

Here, it is possible to transfer the prescription data of the two spectacle lenses of the spectacle lens pair and/or the individual data of the spectacle wearer, the position of wear and/or the object model to a device for producing a spectacle lens according to the exemplary embodiments preferably by means of data remote transfer or "online". The optimization of the spectacle lens considering the anisometropia of the spectacle wearer is performed on the basis of the transmitted prescription data and/or individual data.

The data of the second spectacle lens (thickness, vertex depths of the front and backs surfaces and/or local curvatures), which are taken into consideration in the calculation of the course of the principal ray and the associated wavefront, may be theoretical data relating to a reference spectacle lens with the prescription values (i.e. with the specified spherical, cylindrical, progressive and/or prismatic powers) required for the correction of the refractive deficit.

However, it is possible to obtain the data of the spectacle lens by measuring the vertex depths of the front and/or the back surface e.g. by means of scanning devices or an interferometer. The measurement is preferably performed in points of a raster, which are located at a predetermined distance. The entire surface can subsequently be reconstructed e.g. by means of spline functions. This allows possible manufacture-related deviations of the vertex depths to be taken into consideration in the calculation or optimization of the spectacle lens as well. The measurement data of the second spectacle lens can also be transmitted to a device for producing a spectacle lens according to the exemplary embodiments by means of data remote transfer ("online").

Preferably, one of the two surfaces of the first spectacle lens, which is preferably the object-side front surface, is a simple rotationally symmetrical surface. The optimization of the spectacle lens then preferably comprises a surface optimization of the opposite surface, which is preferably the eye-side back surface, so that the above-mentioned target function is minimized. The thus optimized surface usually is a non-rotationally symmetrical surface, e.g. an aspherical, an atoroidal, or a progressive surface.

As is schematically illustrated in FIG. 4, a computer program product (i.e. a computer program claimed in the patent category of a device) 200 is provided, which is designed to—when loaded and executed on a suitable computer 100 or network-perform a method for optimizing or calculating at least one first spectacle lens for a pair of spectacle lenses for use together with a second spectacle lens of the pair of spectacle lenses in spectacles for a specific situation of wear. The computer program product 200 can be stored on a physical storage medium or program carrier 120. The computer program product can further be present as a program signal.

With reference to FIG. 4, a possible computer or network architecture will be described in the following. The processor 110 of the computer 100 is e.g. a central processor (CPU), a microcontroller (MCU), or a digital signal processor (DSP). The storage 120 symbolizes elements storing data and commands either in a temporally limited or permanent fashion. Even though the storage 120 is shown as part of the computer 100 for the sake of better understanding, the storage function can be implemented elsewhere, e.g. in the processor itself (e.g. cache, register) and/or also in the network 300, for example in the computers 101/102. The storage 120 may be a Read-Only Memory (ROM), a Random-Access Memory (RAM), a programmable or non-programmable PROM, or a memory with other access options. The memory 120 may physically be implemented or stored on a computer-readable program carrier, for example on:

(a) a magnetic carrier (hard disk, floppy disk, magnetic tape);
(b) an optical carrier (CD-ROM, DVD);
(c) a semiconductor carrier (DRAM, SRAM, EPROM, EEPROM).

Optionally, the memory 120 is distributed across different media. Parts of the memory 120 can be attached in a fixed or exchangeable manner. The computer 100 uses known means, such as floppy-disk drives, for reading and writing.

The memory 120 stores support components, such as a Bios (Basic Input Output System), an operating system (OS), a program library, a compiler, an interpreter and/or a spreadsheet or word processing program. These components are not illustrated for the sake of better understanding. Support components are commercially available and can be installed or implemented on the computer 100 by experts.

The processor 110, the memory 120, the input and output devices are joined via at least one bus 130 and/or are optionally connected via the (mono, bi, or multi-directional) network 300 (e.g. the Internet) or are in communication with each other. The bus 130 and the network 300 represent logical and/or physical connections, which transmit both commands and data signals. The signals within the computer 100 are mainly electrical signals, whereas the signals in the network are electrical, magnetic and/or optical signals or also wireless radio signals.

Network environments (such as the network 300) are common in offices, company-wide computer networks, Intranets, and on the Internet (i.e. World Wide Web). The physical distance between the computers in the network does not have any significance. The network 300 may be a wireless or wired network. Possible examples for implementations of the network 300 are: a Local Area Network (LAN), a Wireless Local Area Network (WLAN), a Wide Area Network (WAN), an ISDN network, an infrared link (IR), a radio link, such as the Universal Mobile Telecommunication System (UMTS) or a satellite link. Transmission protocols and data formats are known. Examples are: TCP/IP (Transmission Control Protocol/Internet Protocol), HTTP (Hypertext Transfer Protocol), URL (Unique Resource Locator), HTML (Hypertext Markup Language), XML (Extensible Markup Language), WML (Wireless Application Markup Language), Wireless Application Protocol (WAP), etc.

The input and output devices may be part of a user interface 160. The input device 140 is a device providing data and instructions to be processed by the computer 100. For example, the input device 140 is a keyboard, a pointing device (mouse, trackball, cursor arrows), microphone, joystick, scanner. Even though the examples are all devices with human interaction, preferably via a graphical user interface, the device 140 can also do without human interaction, such as a wireless receiver (e.g. by means of a satellite or terrestrial antenna), a sensor (e.g. a thermometer), a counter (e.g. a piece counter in a factory). The input device 140 can be used for reading the storage medium or carrier 170.

The output device 150 designates a device displaying instructions and data that have already been processed. Examples are a monitor or a different display (cathode ray tube, flat screen, liquid crystal display, loudspeakers, printer, vibration alarm). Similar to the input device 140, the output device 150 preferably communicates with the user, preferably via a graphical user interface. The output device may also communicate with other computers 101, 102, etc.

The input device 140 and the output device 150 can be combined in one single device. Both devices 140, 150 can be provided selectively.

The computer program product 200 comprises program instructions and optionally data causing the processor 110, among others, to perform the method steps of the method according to the disclosure herein or a preferred embodiment thereof. In other words, the computer program 200 defines the function of the computer 100 and its interaction with the network system 300. For example, the computer program product 200 can be present as a source code in an arbitrary programming language and/or as a binary code in a compiled form (i.e. machine-readable form). A skilled person is able to use the computer program product 200 with any of the above-explained support components (e.g. compiler, interpreter, operating system).

Even though the computer program product 200 is shown as being stored in the memory 120, the computer program product 100 may as well be stored elsewhere (e.g. on the storage medium or program carrier 170).

The storage medium 170 is exemplarily shown to be external to the computer 100. In order to transfer the computer program product 200 to the computer 100, the storage medium 170 can be inserted into the input device 140. The storage medium 170 can be implemented as an arbitrary computer-readably carrier, for example as one of the above-explained media (cf. memory 120). The program signal 180, which is preferably transferred to the computer 100 via the network 300, can also include the computer program product 200 or be a part of it.

Interfaces for coupling the individual components of the computer system 50 are also known. The interfaces are not shown for the sake of simplification. An interface can e.g. have a serial interface, a parallel interface, a gameport, a universal serial bus (USB), an internal or external modem, a graphics adapter and/or a soundcard.

It is particularly possible to transfer prescription data of the spectacle lenses preferably together with individual data of the spectacle wearer (including the data of the individual situation of wear) and/or data of the spectacle lens (refractive index, vertex depths of the front and back surfaces) to a device for producing a spectacle lens according to the exemplary embodiments preferably by means of data remote transfer. Then, the optimization of the spectacle lens is preferably performed on the basis of the transmitted prescription data and individual data.

While the foregoing has been described in conjunction with an exemplary embodiment, it is understood that the term "exemplary" is merely meant as an example, rather than the best or optimal. Accordingly, the disclosure herein is intended to cover alternatives, modifications and equivalents, which may be included within the spirit and scope of the disclosed apparatus and method.

Additionally, in the preceding detailed description, numerous specific details have been set forth in order to provide a thorough understanding of the present invention. However, it should be apparent to one of ordinary skill in the art that the present invention may be practiced without these specific details. In other instances, well-known methods, procedures, components, and circuits have not been described in detail so as not to unnecessarily obscure aspects of the disclosure herein.

The invention claimed is:

1. A method for producing at least one first spectacle lens of a pair of spectacle lenses for use together with a second spectacle lens of the pair of spectacle lenses in spectacles for a specific situation of wear, the method comprising:

determining, by an input device, a plurality of monocular evaluation points $i_1$ for the first spectacle lens;

determining, by the input device, a plurality of pairs of binocular evaluation points $(i_1^b, i_2^b)$, each pair including one binocular evaluation point $i_1^b$ of the first spectacle lens and a binocular evaluation point $i_2^b$ of the second spectacle lens that corresponds to the binocular evaluation point $i_1^b$ based on the specific situation of wear;

calculating, by a processor, optical parameters for at least one surface of the first spectacle lens to minimize the value of a target function $$F = g^{(1)} F_{mono}^{(1)} + g^{bino} F_{bino} + \tilde{F}$$

corresponding to the pair of spectacle lenses, wherein the first monocular function $F_{mono}^{(1)}$, with a weighting factor $g^{(1)}$, depends on values of at least one first monocular optical property $Mon^{(m1)}$ at the plurality of monocular evaluation points $i_1$, the binocular function $F_{bino}$, with a weighting factor $g^{bino}$, depends on values of at least one second monocular optical property $Mon^{(b)}$ at the plurality of pairs of binocular evaluation points $(i_1^b, i_2^b)$, and $\tilde{F}$ is a remainder term, and wherein the binocular function is defined according to $$F_{bino} = \sum_k \sum_i g_{bin}^{(k)}(i) \left( Bin^{(k)}(i) - Bin_{Soll}^{(k)}(i) \right)^2,$$

such that deviations of the values of at least one binocular optical property $Bin^{(k)}$ from associated desired values $Bin_{Soll}^{(k)}$ at evaluation points i of the first spectacle lens are taken into consideration with respective weighting factors $g_{bin}^{(k)}(i)$, wherein the summation over the evaluation points i is performed at least over the binocular evaluation points $i_1^b$ of the first spectacle lens, and the at least one binocular optical property $Bin^{(k)}$ for each binocular evaluation point $i_1^b$ of the first spectacle lens depends both on the value of the at least one second monocular optical property $Mon^{(b)}$ at the binocular evaluation point $i_1^b$ of the first spectacle lens and on the value of the at least one second monocular optical property $Mon^{(b)}$ at the corresponding binocular evaluation point $i_2^b$ of the second spectacle lens; and producing the at least one first spectacle lens of the pair of spectacle lenses in accordance with the calculated optical parameters.

2. The method according to claim 1, further comprising:

determining a plurality of monocular evaluation points $i_2$ of the second spectacle lens, wherein the target function includes a further addend $g^{(2)} F_{mono}^{(2)}$, and wherein the second monocular function $F_{mono}^{(2)}$, with a weighting factor $g^{(2)}$, depends on the values of at least one third monocular optical property $Mon^{(m2)}$ at the plurality of monocular evaluation points $i_2$.

3. The method according to claim 2, wherein at least one of the first monocular function $F_{mono}^{(1)}$ and the second monocular function $F_{mono}^{(2)}$ is defined according to $$F_{mono}^{(s)} = \sum_m \sum_{i_s} g_s^{(m)}(i_s) \left( Mon^{(m)}(i_s) - Mon_{Soll}^{(m)}(i_s) \right)^2,$$

such that deviations of the values of at least one monocular optical property $\text{Mon}^{(m)}$ of associated desired values $\text{Mon}_{s,Soll}^{(m)}$ at the evaluation points $i_s$ of the first (s=1) or the second (s=2) spectacle lens are taken into consideration with respective weighting factors $g_s^{(m)}(i_s)$.

4. The method according to claim 2, wherein at least one of the at least one first monocular optical property, which is taken into consideration in the first monocular function $F_{mono}^{(1)}$ and the second monocular function $F_{mono}^{(2)}$, comprises at least one of the spherical equivalent $\text{Mon}^{(1)}=S_A$ and the amount of the cylinder $\text{Mon}^{(2)}=Z_A$ of the refractive deficit of the first or second spectacle lens.

5. The method according to claim 2, further comprising minimizing the first monocular function $F_{mono}^{(1)}$ or the second monocular function $F_{mono}^{(2)}$ before the calculating step.

6. The method according to claim 1, wherein the binocular function $F_{bino}$ for each pair of binocular evaluation points $(i_1^b, i_2^b)$ depends on the difference $$\text{Mon}^{(b)}(i_1^b) - \text{Mon}^{(b)}(i_2^b)$$

between the value of the second monocular optical property $\text{Mon}^{(b)}$ at the binocular evaluation point $i_1^b$ of the first spectacle lens and the value of the second monocular optical property $\text{Mon}^{(b)}$ at the corresponding binocular evaluation point $i_2^b$ of the second spectacle lens.

7. The method according to claim 1, further comprising:
determining a plurality of first monocular evaluation points $i_1^m$ as the plurality of evaluation points $i_1$ of the first spectacle lens for which no corresponding evaluation point of the second spectacle lens exists in the specific situation of wear, and
associating one evaluation point $i_2$ of the second spectacle lens as a second monocular reference point $i_2^r$ for each first monocular evaluation point $i_1^r$, respectively,
wherein the calculating step is performed such that the summation over the evaluation points i in the binocular function $F_{bino}$ is performed over all evaluation points $i_1$ of the first spectacle lens, and
wherein the at least one binocular optical property $\text{Bin}^{(k)}$ for each first monocular evaluation point $i_1^m$ of the first spectacle lens depends both on the value of the at least one second monocular optical property $\text{Mon}^{(b)}$ at the first monocular evaluation point $i_1^m$ of the first spectacle lens and on the value of the at least one second monocular optical property $\text{Mon}^{(b)}$ at the second monocular reference point $i_2^r$ of the second spectacle lens associated with the respective first monocular evaluation point $i_1^m$.

8. The method according to claim 7, wherein every monocular evaluation point $i^m$ of said one spectacle lens is assigned the evaluation point, which is horizontally symmetrical thereto in the specific situation of wear, of the other spectacle lens as a corresponding monocular reference point $i^r$.

9. The method according to claim 1, further comprising:
determining a plurality of second monocular evaluation points $i_2^m$ as the plurality of evaluation points $i_2$ of the second spectacle lens for which no corresponding evaluation point of the first spectacle lens exists in the specific situation of wear, and
associating one evaluation point $i_1$ of the first spectacle lens as a first monocular reference point $i_1^r$ for each second monocular evaluation point $i_2^m$, respectively,
wherein the calculating step is performed such that the summation over the evaluation points i in the binocular function $F_{bino}$ is further performed over the second monocular evaluation points, and
wherein the at least one binocular optical property $\text{Bin}^{(k)}$ for each second monocular evaluation point $i_2^m$ of the second spectacle lens depends both on the value of the at least one second monocular optical property $\text{Mon}^{(b)}$ at the second monocular evaluation point $i_2^m$ of the second spectacle lens and on the value of the at least one second monocular optical property $\text{Mon}^{(b)}$ at the first monocular reference point $i_1^r$ of the first spectacle lens associated with the respective second monocular evaluation point $i_2^m$.

10. The method according to claim 1, wherein the at least one second monocular optical property $\text{Mon}^{(b)}$ comprises a non-prismatic optical property.

11. The method according to claim 1, further comprising determining, by means of ray tracing assuming orthotropia, the binocular evaluation point $i_2^b$ of the second spectacle lens for the specific situation of wear that corresponds to each binocular evaluation point $i_1^b$ of the first spectacle lens.

12. The method according to claim 1, further comprising:
determining a dominant eye; and
associating the second spectacle lens of the pair of spectacle lenses with the dominant eye.

13. The method according to claim 1, further comprising varying the at least one surface of the first spectacle lens, based on the calculated optical parameters, to minimize the target function F, while the second spectacle lens remains unchanged.

14. The method according to claim 1, further comprising varying at least one surface of the second spectacle lens to minimize the target function F, while the first spectacle lens remains unchanged.

15. The method according to claim 1, further comprising varying at least one surface of the first spectacle lens prior to varying at least one surface of the second spectacle lens.

16. The method according to claim 1, further comprising varying respective surfaces of the first and second spectacle lenses one after the other several times in an alternating manner.

17. The method according to claim 1, further comprising a plurality of two-sided variation steps, each two-sided variation step including:
modifying at least one surface of the first spectacle lens and at least one surface of the second spectacle lens; and
analyzing the target function for the modified spectacle lenses.

18. A device for producing a spectacle lens, the device comprising:
an input device configured to obtain a plurality of monocular evaluation points $i_1$ for the first spectacle lens, and for obtaining a plurality of pairs of binocular evaluation points $(i_1^b, i_2^b)$, each pair including one binocular evaluation point $i_1^b$ of the first spectacle lens and a binocular evaluation point $i_2^b$ of the second spectacle lens that corresponds to the binocular evaluation point $i_1^b$ based on the specific situation of wear; and
a processor configured to calculate optical parameters for at least one first spectacle lens of a pair of spectacle lenses for use together with a second spectacle lens of the pair of spectacle lenses in spectacles for a specific situation of wear, to minimize the value of a target function $$F = g^{(1)} F_{mono}^{(1)} + g^{bino} F_{bino} + \tilde{F}$$

corresponding to the pair of spectacle lenses,
wherein the first monocular function $F_{mono}^{(1)}$, with a weighting factor $g^{(1)}$, depends on the values of the at least one first monocular optical property $\text{Mon}^{(m1)}$ at the plurality of monocular evaluation points $i_1$, the binocular function $F_{bino}$, with a weighting factor $g^{bino}$, depends on the values of the at least one second monocular optical property $Mon^{(b)}$ at the plurality of pairs of binocular evaluation points $(i_1{}^b, i_2{}^b)$, and $\tilde{F}$ is a remainder term, wherein the binocular function is defined according to $$F_{bino} = \sum_k \sum_i g_{bin}^{(k)}(i) \left( Bin^{(k)}(i) - Bin_{Soll}^{(k)}(i) \right)^2,$$

such that deviations of the values of at least one binocular optical property $Bin^{(k)}$ from associated desired values $Bin_{Soll}^{(k)}$ at evaluation points i of the first spectacle lens are taken into consideration with respective weighting factors $g_{bin}^{(k)}(i)$, wherein the summation over the evaluation points i is performed at least over the binocular evaluation points $i_1{}^b$ of the first spectacle lens, and the at least one binocular optical property $Bin^{(k)}$ for each binocular evaluation point $i_1{}^b$ of the first spectacle lens depends both on the value of the at least one second monocular optical property $Mon^{(b)}$ at the binocular evaluation point $i_1{}^b$ of the first spectacle lens and on the value of the at least one second monocular optical property $Mon^{(b)}$ at the corresponding binocular evaluation point $i_2{}^b$ of the second spectacle lens, and wherein the first spectacle lens of the pair of spectacle lenses is produced in accordance with the calculated optical parameters.

* * * * *